United States Patent
Robson

(10) Patent No.: US 12,158,102 B2
(45) Date of Patent: Dec. 3, 2024

(54) ROTARY DRIVE APPARATUS

(71) Applicant: David George Robson, Palmerston North (NZ)

(72) Inventor: David George Robson, Palmerston North (NZ)

( * ) Notice: Subject to any disclaimer, the term of this patent is extended or adjusted under 35 U.S.C. 154(b) by 0 days.

(21) Appl. No.: 18/250,058

(22) PCT Filed: Oct. 22, 2021

(86) PCT No.: PCT/NZ2021/050186
§ 371 (c)(1),
(2) Date: Apr. 21, 2023

(87) PCT Pub. No.: WO2022/086348
PCT Pub. Date: Apr. 28, 2022

(65) Prior Publication Data
US 2023/0392542 A1    Dec. 7, 2023

(30) Foreign Application Priority Data

Oct. 23, 2020 (NZ) .......................... 769323

(51) Int. Cl.
*F02B 53/10* (2006.01)
*F02B 53/04* (2006.01)
(Continued)

(52) U.S. Cl.
CPC .............. *F02B 53/04* (2013.01); *F02B 53/10* (2013.01); *F02B 53/12* (2013.01); *F02B 55/02* (2013.01);
(Continued)

(58) Field of Classification Search
CPC .......... F02B 53/04; F02B 53/10; F02B 53/12; F02B 55/02; F02B 55/08; F02B 55/16; F02B 2730/03
See application file for complete search history.

(56) References Cited

U.S. PATENT DOCUMENTS

| | | |
|---|---|---|
| 3,435,808 A | 4/1969 | Allender |
| 4,086,880 A | 5/1978 | Bates |

(Continued)

FOREIGN PATENT DOCUMENTS

| | | |
|---|---|---|
| CN | 102330598 A | 1/2012 |
| CN | 104040115 B | 9/2014 |

(Continued)

OTHER PUBLICATIONS

International Search Report and Written Opinion in International Application No. PCT/NZ2021/050186. Jan. 20, 2022.

(Continued)

*Primary Examiner* — Audrey B. Walter
(74) *Attorney, Agent, or Firm* — Heslin Rothenberg Farley & Mesiti, P.C.

(57) ABSTRACT

A rotary drive apparatus includes a housing, within which is located a first rotor and second rotor. The first rotor is rotatable about a first axis and has a rotor element projecting radially therefrom. The second rotor is rotatable about a second axis parallel to the first axis and in a direction opposite to the first rotor. The second rotor includes a recess able to receive the rotor element. The first rotor and the second rotor and housing define a chamber around the first rotor through which the rotor element passes. The chamber has an inlet and an outlet through which a fluid can enter and exit the chamber.

26 Claims, 19 Drawing Sheets

(51) Int. Cl.
*F02B 53/12* (2006.01)
*F02B 55/02* (2006.01)
*F02B 55/08* (2006.01)
*F02B 55/16* (2006.01)

(52) U.S. Cl.
CPC .............. *F02B 55/08* (2013.01); *F02B 55/16* (2013.01); *F02B 2730/03* (2013.01)

(56) References Cited

U.S. PATENT DOCUMENTS

| | | | |
|---|---|---|---|
| 4,561,836 | A | 12/1985 | Wankel |
| 6,129,067 | A * | 10/2000 | Riley .................. F01C 1/20 123/232 |
| 8,517,706 | B2 | 8/2013 | Lurtz |
| 9,752,580 | B2 | 9/2017 | Tommasini |
| 2005/0095160 | A1 | 5/2005 | Lin et al. |
| 2015/0308272 | A1 | 10/2015 | Borgward |
| 2017/0362974 | A1* | 12/2017 | Schulz .................. F02B 55/08 |

FOREIGN PATENT DOCUMENTS

| | | |
|---|---|---|
| CN | 109736896 A | 5/2019 |
| DE | 196982 C | 4/1908 |
| DE | 4025406 A1 | 2/1992 |
| JP | 2006283664 A | 10/2006 |
| WO | 2017118600 A1 | 7/2017 |
| WO | 2020145808 A2 | 7/2020 |

OTHER PUBLICATIONS

Corneli et al. "Experimental studies on the volumetric efficiency of triple screw pumps", Research Gate, 16 pages. Jan. 2014.

Mimmi et al. "Design of three-screw positive displacement rotary pumps", Research Gate, 13 pages. Jan. 1995.

Extended European Search Report, EP Patent Application No. 21883385.3, mailed Jul. 30, 2024.

* cited by examiner

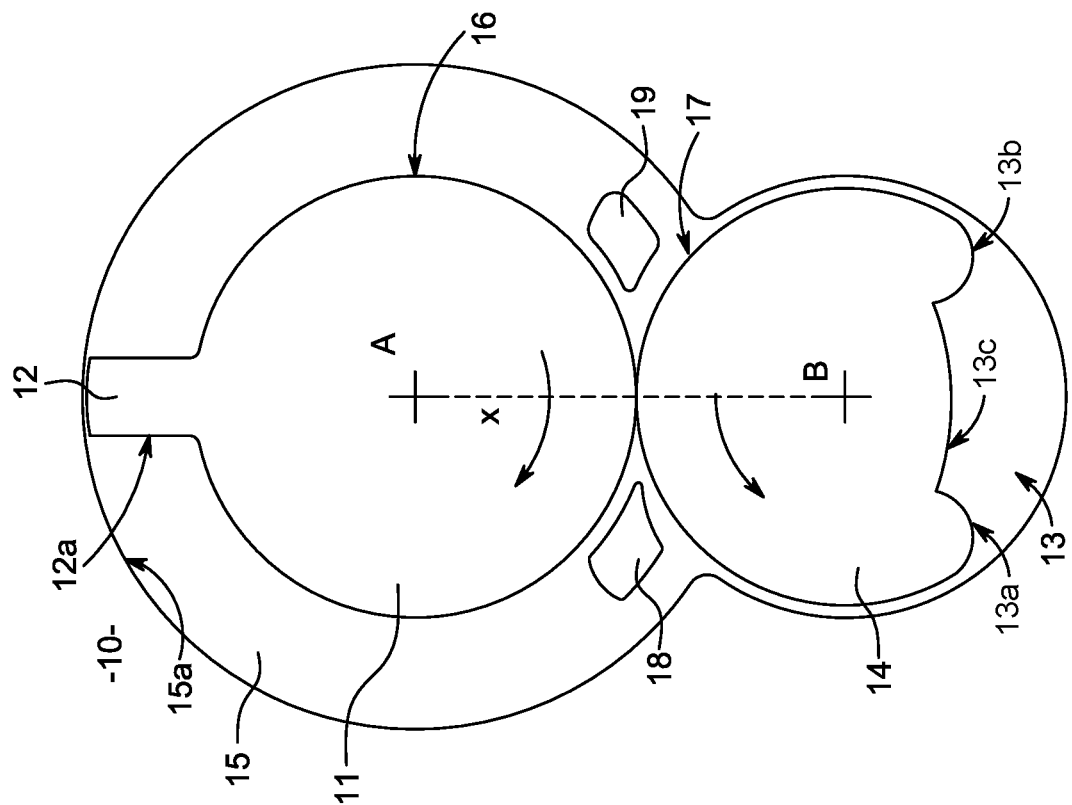
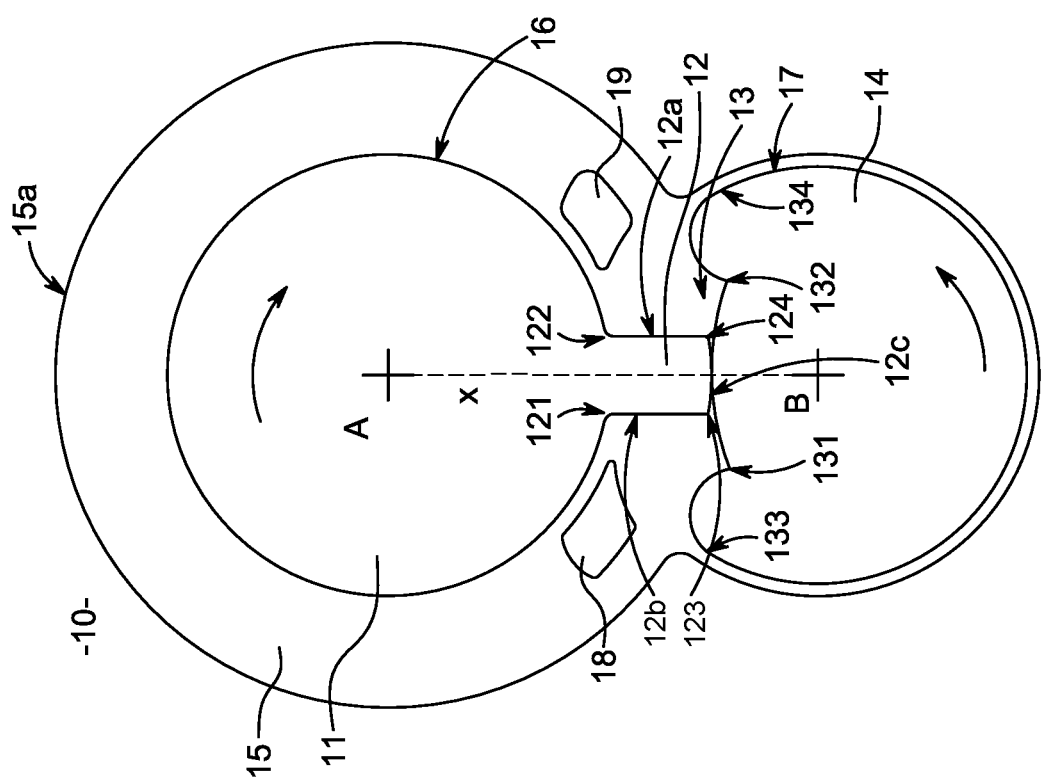

ROTARY DRIVE APPARATUS

CROSS REFERENCE TO RELATED APPLICATIONS

This application is a U.S. National Phase filing under 35 U.S.C. § 371 of International Application PCT/NZ2021/050186, filed Oct. 22, 2021, and published as WO2022/086348A1 on Apr. 28, 2022. PCT/NZ2021/050186 claims priority from New Zealand application number 769323, filed Oct. 23, 2020. The entire contents of each of these prior applications are hereby incorporated herein by reference.

The present invention relates to a rotary drive apparatus suitable as a turbine or fluid pump including a respirator pump. The rotary drive apparatus of the present invention is also suitable as a rotary engine.

BACKGROUND

In principle a rotary drive apparatus transfers energy between a drive shaft and a moving or combusting fluid. A number of arrangements for rotary drive apparatus are known, and there are a wide range of uses for them.

In a turbine, the moving fluid imparts energy to the drive shaft. Current turbines utilise blades that receive pressure from a liquid or a gas in order to force the turbine to rotate. Such a concept does not utilise all of the energy available in the gas or fluid due to a significant proportion of the gas or fluid sliding past the blades of the turbine, without contacting the blades, nor transferring potential energy to the blades.

In a rotary engine, the energy transfer is from combustion fluid to the drive shaft. Internal combustion engines, without the need for pistons, e.g. rotary engines, are known. There is a particular advantage in finding alternatives to piston-driven engines as a substantial amount of energy is lost in moving the pistons up and down within their respective chambers. The actual efficiency of a conventional "four-stroke" engine is low compared to the potential energy provided by the fuel. The known concept of a rotary engine attempts to replace the need for piston chambers with a machine which relies on centripetal energy. Previously, rotary engines and pumps have had complicated configurations and difficult assembly methods, making them expensive to produce. Furthermore, existing rotary engine designs have complex mechanisms involving side-to-side motion in addition to rotary motion. The overall result is a loss in power and efficiency. Known rotary engines are a useful alternative to conventional four-stroke engines but not a viable complete replacement.

The object of the present invention is to produce a rotary drive apparatus which provides more efficient use of energy, or a smoother operation, or at least, provides the public with a useful alternative.

SUMMARY OF THE INVENTION

In a first aspect of the invention there is provided a rotary drive apparatus comprising a housing, within which is located a first rotor and second rotor, the first rotor being rotatable about a first axis and having a rotor element projecting radially therefrom, and a second rotor being rotatable about a second axis parallel to the first axis and in a direction opposite to the first rotor, the second rotor comprising a recess able to receive the rotor element, wherein the first rotor and the second rotor and housing define a chamber around the first rotor through which the rotor element passes, the chamber having an inlet and an outlet through which a fluid can enter and exit the chamber.

In some embodiments, the first and second rotor are able to remain in sealing engagement during rotation.

In some embodiments, the rotor element does not contact the floor of the recess during rotation.

Optionally, the apparatus further comprises sealing means between the first rotor and the housing and second rotor.

Optionally, the apparatus further comprises sealing means able to form a seal between the first rotor and the housing and/or second rotor.

Optionally, the apparatus further comprises sealing means on the rotor element able to form a seal between the rotor element and the housing and/or second rotor.

Optionally, the apparatus further comprises a shoulder projecting from the first rotor adjacent to the rotor element, to at least partially occlude the inlet and/or the outlet during part of a cycle of the first rotor.

Optionally, the preceding face and/or the trailing face of the rotor element or the shoulder comprise a shape which reduces or mitigates drag in the fluid.

In a preferred embodiment the apparatus is adapted to introduce a pressurized fluid through the inlet means to impart energy onto the rotor element.

Optionally, the fluid enters the inlet at an angle offset from the axis of rotation of the first rotor, so as to provide more direct pressure on the rotor element.

Optionally, in the embodiment of paragraph [00014] the apparatus further comprises sealing means between the second rotor and the housing.

Optionally, in the embodiment of paragraph [00014] the apparatus further comprises a shoulder projecting from the first rotor adjacent to the rotor element.

Optionally, in the embodiment of paragraph [00014] the apparatus further comprises two shoulders, projecting from the first rotor on either side of the rotor element.

Optionally, in the embodiment of paragraph [00014] during rotation of the first rotor a shoulder precedes the rotor element, and occludes the inlet during part of a cycle of the first rotor.

In some embodiments, the apparatus comprises two rotor elements and two recesses in the second rotor able to receive the rotor elements.

In some embodiments, the second rotor has twice the diameter of the first rotor, and the second rotor comprises two recesses able to receive the rotor element.

In some embodiments, the inlet and the outlet are located in the zone of the chamber through which the rotor element travels, and are located to avoid the zone through which the second rotor travels.

Optionally, the inlet and outlet are located on a region of the chamber wall substantially perpendicular to the rotational axis of the rotor.

In some embodiments, when the rotor element is engaged in the recess, the rotor element occludes both the inlet and the outlet at the same time.

In some embodiments, the rotor element occupies a sector of between about 60° and about 120° with respect to the axis of the first rotor.

In some embodiments, the rotor element occupies a sector of about 80° with respect to the axis of the first rotor.

In some embodiments, the apparatus further comprises an extension to the inlet and/or the outlet further creating a venting region.

In some embodiments, the venting region avoids the zone through which the second rotor travels, while in other embodiments, the venting region is located in the zone through which the second rotor travels.

Usefully, in embodiments the rotor element is defined by: a leading face which during rotation of the rotor precedes the other parts of the rotor element, a trailing face opposed to the leading face, and an outer face which during the rotation of the first rotor, contacts or nearly contacts the wall of the chamber; an outer leading junction between the leading face and the outer face of the rotor element; an outer trailing junction between the trailing face and the outer face of the rotor element; an inner leading junction between the outer wall of the first rotor and the leading face of the rotor element; an outer trailing junction between the outer wall of the first rotor and the trailing face of the rotor element; and the recess is defined by: walls spaced apart to accommodate the leading face and the trailing face of the rotor element, and a floor which contacts or nearly contacts the outer face of the rotor element when the rotor element is received in the recess; an inner leading junction between the floor and the leading wall of the recess; an inner trailing junction between the floor and the trailing wall of the recess; an outer leading junction between the leading wall of the recess, and the outer wall of the second rotor; and an outer trailing junction between the trailing wall of the recess, and the outer wall of the second rotor.

In a preferred embodiment, at an engaged position where the outer junctions of the rotor element are equidistant from a line X connecting the axes of the rotors, the inner junctions of the rotor element are located by lines extending from the axis of the first rotor and making angles of about +37°, −37° with said line X; the outer junctions of the rotor element are located by a line extending from the axis of the first rotor and making angles of about +30°, −30° with said line X; the inner junctions of the recess are located by a line extending from the axis of the second rotor and making angles of about +38°, −38° with said line X; and the inlet and outlet are located in the zone through which the rotor element travels, but they avoid the zone through which the second rotor travels.

In another preferred embodiment, at an engaged position where the outer junctions of the rotor element are equidistant from a line X connecting the axes of the rotors, the inner and outer junctions of the rotor element are located by lines extending from the axis of the first rotor and making angles of about +40°, −40° with said line X; the inner junctions of the recess are located by a line extending from the axis of the second rotor and making angles of about +43°, −43° with said line X; the outer junctions of the recess are located by a line extending from the axis of the second rotor and making angles of about +46°, −46° with said line X; and the inlet and outlet are located in the zone through which the rotor element travels, but they avoid the zone through which the second rotor travels.

In another preferred embodiment, at an engaged position where the outer junctions of the rotor element are equidistant from a line X connecting the axes of the rotors, the inner and outer junctions of the rotor element are located by lines extending from the axis of the first rotor and making angles of about +40°, −40° with said line X; the inlet is located in the zone through which the rotor element travels and within a line extending from the axis of the first rotor and making an angle of about +38° with said line X, and avoids the zone through which the second rotor travels, the outlet is located in the zone through which the rotor element travels and within a line extending from the axis of the first rotor and making an angle of about −39° with said line X, and avoids the zone through which the second rotor travels, the inner junctions of the recess are located by a line extending from the axis of the second rotor and making angles of about +45°, −45° with said line X; the outer junctions of the recess are located by a line extending from the axis of the second rotor and making angles of about +53°, −53° with said line X.

In preferred embodiments, the space between the inlet and outlet is defined by lines extending from the axes of both rotors, and making angles of about +15°, −15° with said line X.

In another preferred embodiment, at an engaged position where the outer junctions of the rotor element are equidistant from a line X connecting the axes of the rotors, the inner and outer junctions of the rotor element are located by lines extending from the axis of the first rotor and making angles of about +40°, −40° with said line X; the inlet is located in the zone through which the rotor element travels and within a line extending from the axis of the first rotor and making an angle of about +38° with said line X, and avoids the zone through which the second rotor travels, the outlet is located in the zone through which the rotor element travels and within a line extending from the axis of the first rotor and making an angle of about −39° with said line X, and avoids the zone through which the second rotor travels, the inner junctions of the recess are located by a line extending from the axis of the second rotor and making angles of about +46°, −46° with said line X; and the outer junctions of the recess are located by a line extending from the axis of the second rotor and making angles of about +53°, −53° with said line X.

In some embodiments of the invention described above, the apparatus is adapted to impart rotational energy to the first rotor or the second rotor to draw a fluid through the inlet means and push the fluid out through the outlet means.

Preferably, in the embodiment of paragraph [00035] the fluid is air or an air/oxygen mixture and the apparatus provides a pump for a respirator.

Optionally, in the embodiment of paragraph [00035], during rotation of the first rotor a shoulder follows the rotor element, and occludes the outlet during part of a cycle of the first rotor.

Optionally, in the embodiment of paragraph [00035], the outlet comprises a one-way valve which can seal as pressure is released.

In some embodiments of the invention, the apparatus comprises two inlets.

In some embodiments, the apparatus further comprises ignition means and is adapted to introduce a combustible fluid or mixture of fluids through the inlet for combustion to impart energy onto the rotor element.

Optionally, in embodiments comprising ignition means the apparatus further comprises a shoulder projecting from the first rotor adjacent to the rotor element, which during rotation of the first rotor precedes the rotor element and occludes the inlet during part of a cycle of the first rotor.

In a second aspect of the invention there is provided a method of extracting energy from fluid using an apparatus as described above, the method comprising introducing a pressurized fluid into the chamber via the inlet to impart energy onto the rotor element; and allowing the pressurized fluid to exit the chamber via the outlet. Relatedly, the present invention provides the use of an apparatus as described herein, as a turbine.

In a third aspect of the invention there is provided a method of extracting energy from a combustible fluid using an apparatus as described above, the method comprising the steps: introducing a combustible fluid into the chamber of the apparatus via the inlet(s); igniting the combustible fluid to impart energy onto the rotor element; and allowing the combusted fluid to exit the chamber via the outlet. Relatedly, the present invention provides the use of an apparatus as described herein, as a combustion engine.

In a fourth aspect of the invention there is provided a method of pumping a fluid using the apparatus as described above, the method comprising the steps: placing the inlet(s) of the apparatus into contact with a fluid; and applying rotational energy to the first rotor and/or the second rotor to draw the fluid into the inlet, through the chamber and out the outlet. Relatedly, the present invention provides the use of an apparatus as described herein, as a pump.

Optionally, in the method of the fourth aspect, the fluid is air or an air/oxygen mixture, and the pump is a respirator pump.

DESCRIPTION OF THE DRAWINGS

The rotary drive apparatus of the present invention will now be described hereinafter with reference to the accompanying drawings, illustrating preferred embodiments, where:

FIG. 1 is a view of the inside of the housing of a rotary drive apparatus, suitable for use as a pump, a turbine or an internal combustion engine, FIG. 1a is a view of the inside of the housing of the rotary drive apparatus of FIG. 1 after rotating half a cycle.

DETAILED DESCRIPTION

Definitions

Throughout the description of the invention, and in the claims that follow, except where the context requires otherwise due to express language or necessary implication, the word "comprise" or variations such as "comprises" or "comprising" is used in an inclusive sense, i.e. to specify the presence of the stated feature but not to preclude the presence or addition of further features in various embodiments of the invention. In addition, reference to an element by the indefinite article "a" or "an" does not exclude the possibility that more than one of the element is present, unless the context clearly requires that there be one and only one of the elements. The indefinite article "a" or "an" thus usually means "at least one".

As used herein, the term "fluid" is used generally to refer to a liquid or a gas, and mixtures of each of these, including a fuel/air mixture or an air/oxygen mixture.

It will be apparent that in the present invention, the requirement for or extent of a "seal" or "sealing engagement" will differ depending on the proposed use, including the nature of the fluid and rotation speed. As used herein, the term "sealing engagement" is not intended to refer to a perfect seal, or to imply that a perfect seal is required in all cases. Rather, the term "sealing engagement" indicates that flow in the opposite direction of the rotation of the rotors is at least substantially prevented.

As used herein, the term "about" in relation to an angle includes a range of 5°, preferably 4°, 3°, 2°, 1° or 0.5° greater or lesser than the stated value, and in relation to a percentage includes a range of 5%, preferably 4, 3, 2 or 1% greater or lesser than the stated value.

General Form of Rotary Drive Apparatus

Figure 2:
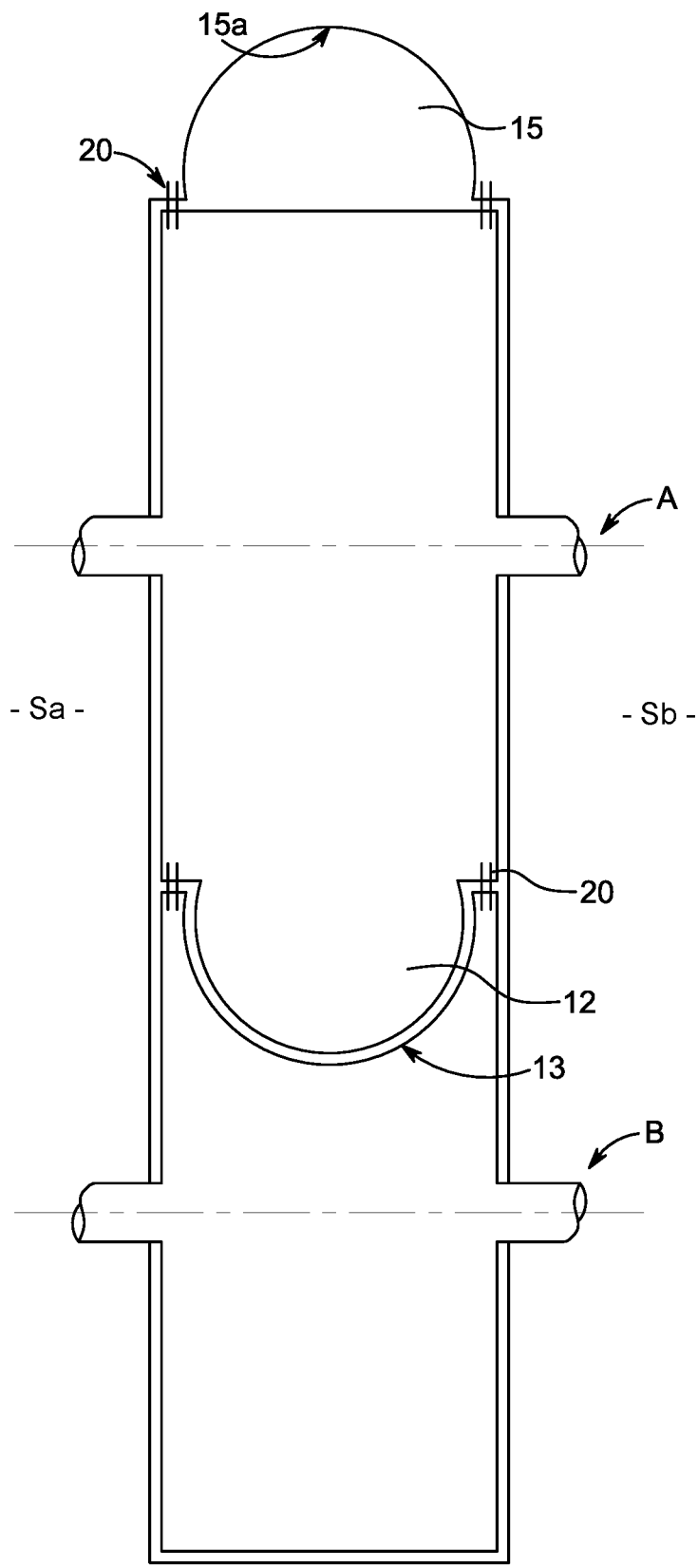
FIG. 2 is a cross section view of the rotary drive of FIG. 1.

A general form of the rotary drive apparatus according to the present invention is illustrated by FIGS. 1 and 2.

FIG. 1 illustrates the "opposing interlocking rotors" concept of the rotary drive apparatus of the present invention. A housing 10 encloses a first rotor 11 and a second rotor 14. Rotor 11 includes a single projecting rotor element 12 to be received by a recess 13 of a second rotor 14.

Together with peripheral walls 16 and 17 of respective rotors 11 and 14, housing 10 defines a chamber around the first rotor through which the rotor element 12 passes. The chamber has at least one inlet 18 and at least one outlet 19 through which a fluid can enter and exit the chamber. In the drawings, the inlet 18 and outlet 19 are shown on a region of the chamber wall 15a substantially perpendicular to the rotational axis of the rotor. However the arrangement of the inlet and outlet can be varied, for example the inlet can be arranged so that fluid enters the chamber from one side Sa of the apparatus (FIG. 2), and exits the chamber on the opposite side Sb (FIG. 2) or optionally an inlet and an outlet can each be provided on sides Sa and Sb of the apparatus to reduce eccentricity. The position of the inlet and outlet in relation to the rotor element and recess can also be varied as described further herein.

In FIGS. 1 and 2, the projecting rotor element 12 and recess 13 engage together once per cycle. When rotor element 12 and recess 13 are not engaged with one another, the first rotor remains in contact with the second rotor, thus the second rotor remains in sealing engagement with the first rotor throughout the rotation. It will therefore be apparent that the rotational speed of rotors 11 and 14 will be the same. Consistency can be achieved by way of a timing belt, cogs (with interlocking teeth) or other timing means known in the art. In FIG. 1, the diameter of each rotor 11 and 14 is substantially the same. If the diameters were different, the larger-diameter rotor would be required to spin faster than the smaller-diameter rotor, complicating the mechanism.

FIG. 1a illustrates the apparatus offset one half cycle from that of FIG. 1. The projecting rotor element 12 is disengaged from recess 13 (and now sealed with wall 15a of chamber 15) and the peripheral walls 16 and 17 of respective rotors 11 and 14 form a seal where they engage for the remainder of the cycle. If it is desired for walls 16 and 17 to seal together during rotation, a high level of machining precision is necessary.

Detailed Geometry of Rotor Element and Recess

The detailed geometry of the rotor element and recess can vary. The rotor element has various faces depicted in FIG. 1 by 12a, 12b and 12c. In the direction of rotation shown in FIG. 1, 12b is the leading face of the rotor element, 12a is the trailing face and the outer face of the rotor element is 12c. The leading face is the face which precedes the other parts of the rotor element and is the first to reach the stationary parts of the device (e.g. the inlet and outlet). The recess 13 generally has walls 13a, 13b, and a floor 13c (marked in FIG. 1A). Wall 13b is the leading wall of the recess which precedes the other parts of the recess when rotor 14 is rotating in the opposite direction to rotor 11.

The different faces of the rotor element and the recess can have a different geometry depending on the purpose, and for example can be straight or have more complex curves. In the description which follows, the geometry of the rotor element and recess is each characterized by four junctions. A junction can be a sharp corner or a curve.

Referring to FIG. 1, the geometry of rotor element 12 is described by: an inner leading junction 121, being a junction between wall 16 of rotor 11 and the leading face 12b of the rotor element 12; an inner trailing junction 122, being a junction between wall 16 of rotor 11 and the trailing face 12a of the rotor element 12; an outer leading junction 123, being a junction between the leading face 12b and the outer face 12c of the rotor element 12; and an outer trailing junction 124, being a junction between the trailing face 12a and the outer face 12c of the rotor element 12.

Similarly, the geometry of recess 13 is described by: an inner leading junction 131, being a junction between the floor 13c and the leading wall 13b of the recess 13; an inner trailing junction 132, being a junction between the floor 13c and the trailing wall 13a of the recess 13; an outer leading junction 133, being a junction between the leading wall 13b of the recess 13, and wall 17 of the rotor 14; and an outer trailing junction 134, being a junction between the trailing wall 13a of the recess 13, and wall 17 of the rotor 14.

It can be seen in FIG. 1 that, for example, junctions 131 and 132 are defined corners. Although junctions 133 and 134 occur in part of a complex curve, they represent the points where the circular profile of wall 17 ends.

A notional line X which joins the axes of shafts A and B is shown as dashed in FIG. 1, and the positions of the junctions can be described by reference to Line X. This is done with reference to an engaged position, where the outer leading junction 123 and outer trailing junction 124 of the rotor element 12 are equidistant from line X.

At such an engaged position, the positions of the junctions 121, 122, 123, 124, may be described by the angle made between two lines: a line connecting the junction with the axis of shaft A, and line X. This is shown in the Figures and discussed further below for certain embodiments. The positions of junctions 121 and 123 can independently be described by such an angle of for example, about +5°, +10°, +15°, +16°, +17°, +18°, +19°, +20°, +21°, +22°, +23°, +24°, +25°, +26°, +27°, +28°, +29°, +30°, +31°, +32°, +33°, +34°, +35°, +36°, +37°, +38°, +39°, +40°, +41°, +42°, +43°, +44°, +45°, +46°, +47°, +48°, +49°, +50°, +51°, +52°, +53°, +54°, +55°, +56°, +57°, +58°, +59°, +60°, +65°, +70°, +75°, +80°, +85°, +90°, +95° or +100°. The positions of junctions 122 and 124 can independently be described by such an angle of for example, about −5°, −10°, −15°, −16°, −17°, −18°, −19°, −20°, −21°, −22°, −23°, −24°, −25°, −26°, −27°, −28°, −29°, −30°, −31°, −32°, −33°, −34°, −35°, −36°, −37°, −38°, −39°, −40°, −41°, −42°, −43°, −44°, −45°, −46°, −47°, −48°, −49°, −50°, −51°, −52°, −53°, −54°, −55°, −56°, −57°, −58°, −59°, −65°, −70°, −75°, −80°, −85°, −90°, −95° or −100°. Similarly, the positions of junctions 131, 132, 133, 134 may be described by the angle made between two lines: a line connecting the junction with the axis of shaft B, and line X. The positions of junctions 131 and 133 can independently be described by such an angle of for example, about −5°, −10°, −15°, −16°, −17°, −180°, −190°, −200°, −21°, −22°, −23°, −24°, −25°, −26°, −27°, −28°, −29°, −30°, −31°, −32°, −33°, −340°, −35°, −36°, −37°, −38°, −39°, −40°, −41°, −42°, −43°, −44°, −45°, −46°, −47°, −48°, −49°, −50°, −510°, −52°, −53°, −54°, −55°, −56°, −57°, −58°, −59°, −60°, −65°, −70°, −75°, −80°, −85°, −900°, −95° or −100°. The positions of junctions 132 and 134 can independently be described by such an angle of for example, about +5°, +10°, +15°, +16°, +17°, +18°, +19°, +20°, +21°, +22°, +23°, +24°, +25°, +26°, +27°, +28°, +29°, +30°, +31°, +32°, +33°, +34°, +35°, +36°, +37°, +38°, +39°, +40°, +41°, +42°, +43°, +44°, +45°, +46°, +47°, +48°, +49°, +50°, +51°, +52°, +53°, +54°, +55°, +56°, +57°, +58°, +59°, +60°, +65°, +70°, +75°, +80°, +85°, +90°, +95° or +100°.

As used herein, a positive angle, e.g. +40°, is an angle measured clockwise from line X, around a specified axis (A or B). A negative angle, e.g. −40°, is an angle measured anticlockwise from line X, around a specified axis (A or B).

The above discussion covers a range of geometries for the outer extent of the rotor element and recess. These features provide various different profiles for engagement and subsequent disengagement of the rotor element with the recess, and with the inlet and outlet. The geometry of the system in cross-section is now discussed.

Rotor Element, Recess and Chamber in Cross Section

Figure 3A:
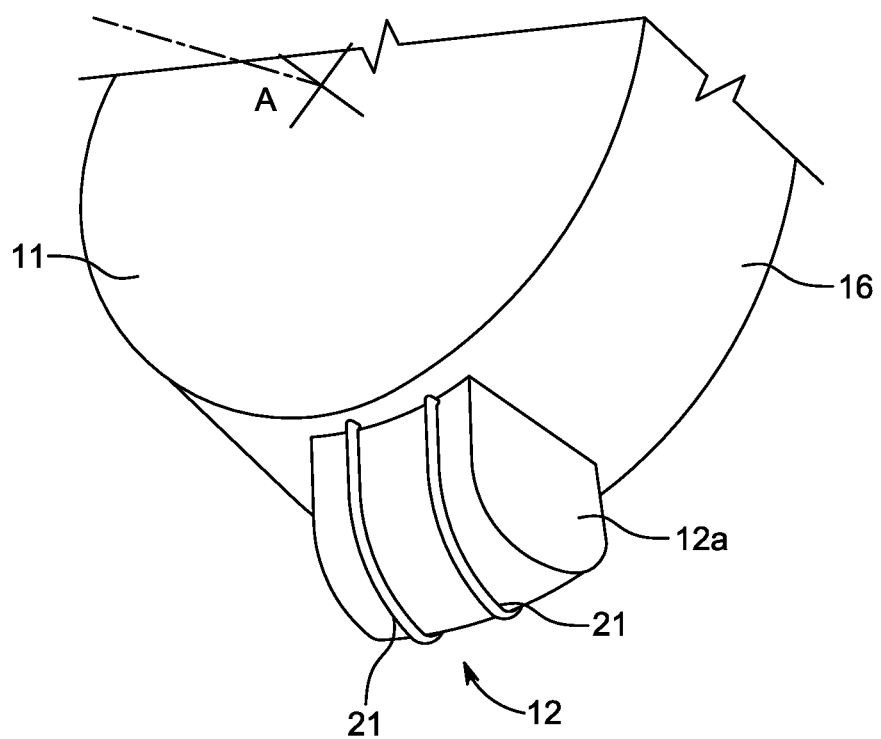
FIG. 3A is a partial perspective view of a rotor illustrating a sealing means for the present invention.
Figure 3B:
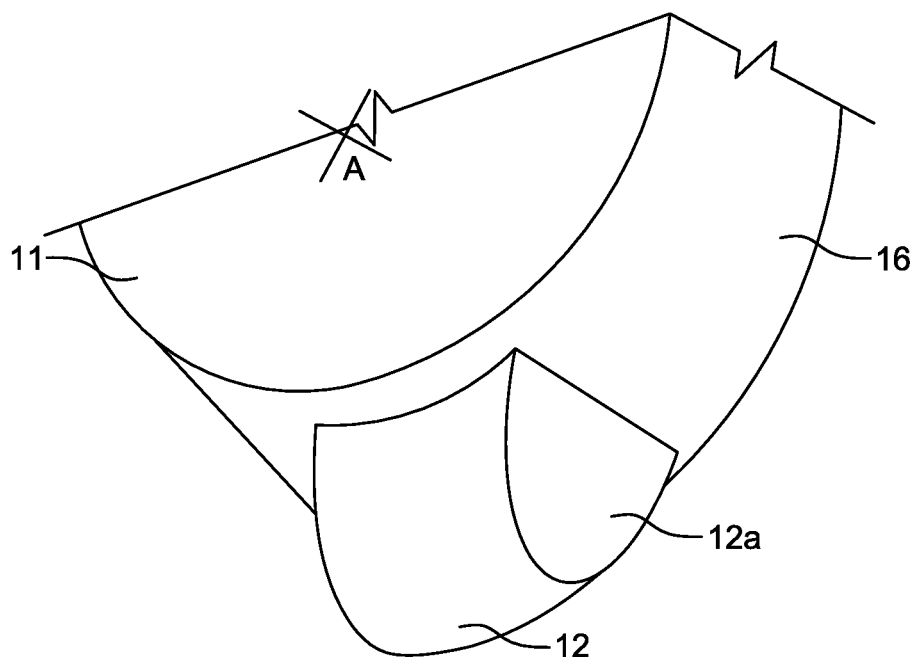
FIG. 3B is a partial perspective view of a rotor for the present invention without sealing means.

A cross section of a rotary drive apparatus according to the invention is illustrated by FIG. 2. In this embodiment, rotor element 12 has a semi-circular outer face 12c which permits accommodation with recess 13. It will be appreciated that FIG. 2 shows only one possibility for features 12a, 12b, 12c of rotor element 12. In the embodiment of FIG. 2, drive shaft A is shown on rotor 11, and rotor 14 rotates about a further shaft B. As shown in FIG. 2, sealing rings denoted generally by numeral 20 can be provided to maintain the integrity of chamber 15. Further sealing means 21 can optionally be provided embedded on to the surface of rotor element 12 to seal with the chamber wall 15a. The configuration of rotor 11 and rotor element 12 with sealing means 21 is illustrated by FIG. 3A. It will be appreciated that sealing rings may not be required if clearances are extremely small. It is expected that embodiments without sealing rings, such as that illustrated by FIG. 3B, will achieve significantly improved efficiency.

While FIGS. 2 and 3A-3C show a curved profile for the rotor element 12 and chamber wall 15a, it will be appreciated that other profiles are possible including a flat profile, which is easier to manufacture. An example of this is shown in FIG. 3D where rotor elements 112, 212 have a flat surface parallel to axes A and B, which contacts the housing 100.

The thickness of the rotors relative to their diameter can vary, and for example can be about 10%, 20%, 30%, 40% or 50% as thick as their diameter.

The shape and size of the projecting rotor element can be adapted in accordance with the laws of fluid dynamics in order to achieve various results.

Figure 3C:
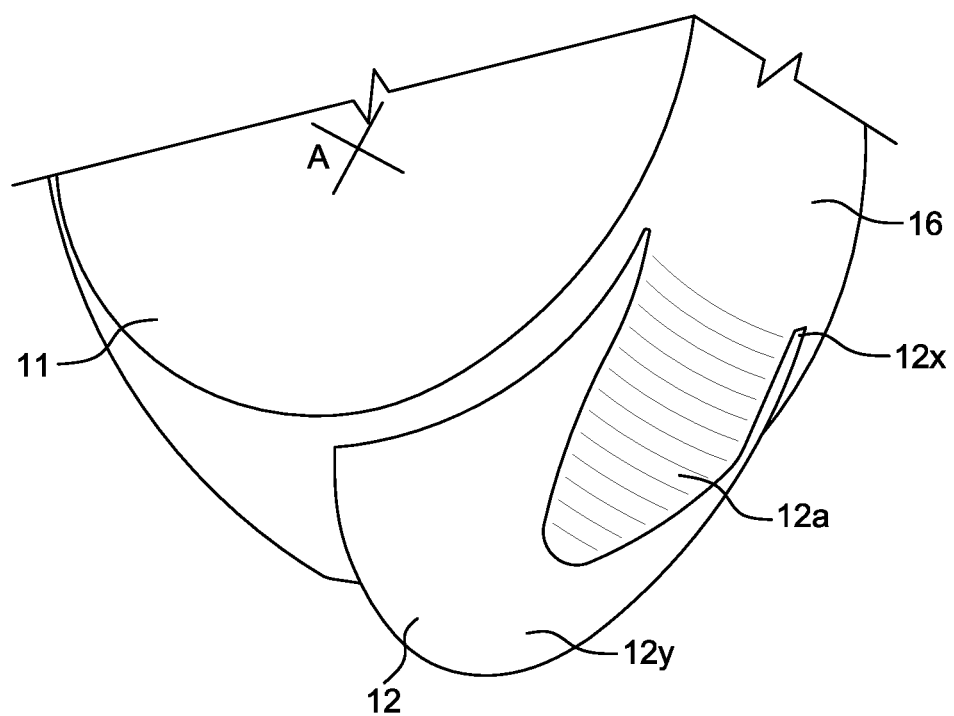
FIG. 3C is a partial perspective view of a rotor for the present invention in which the trailing face of the rotor element comprises a shape which reduces or mitigates drag in the fluid.
Figure 3D:
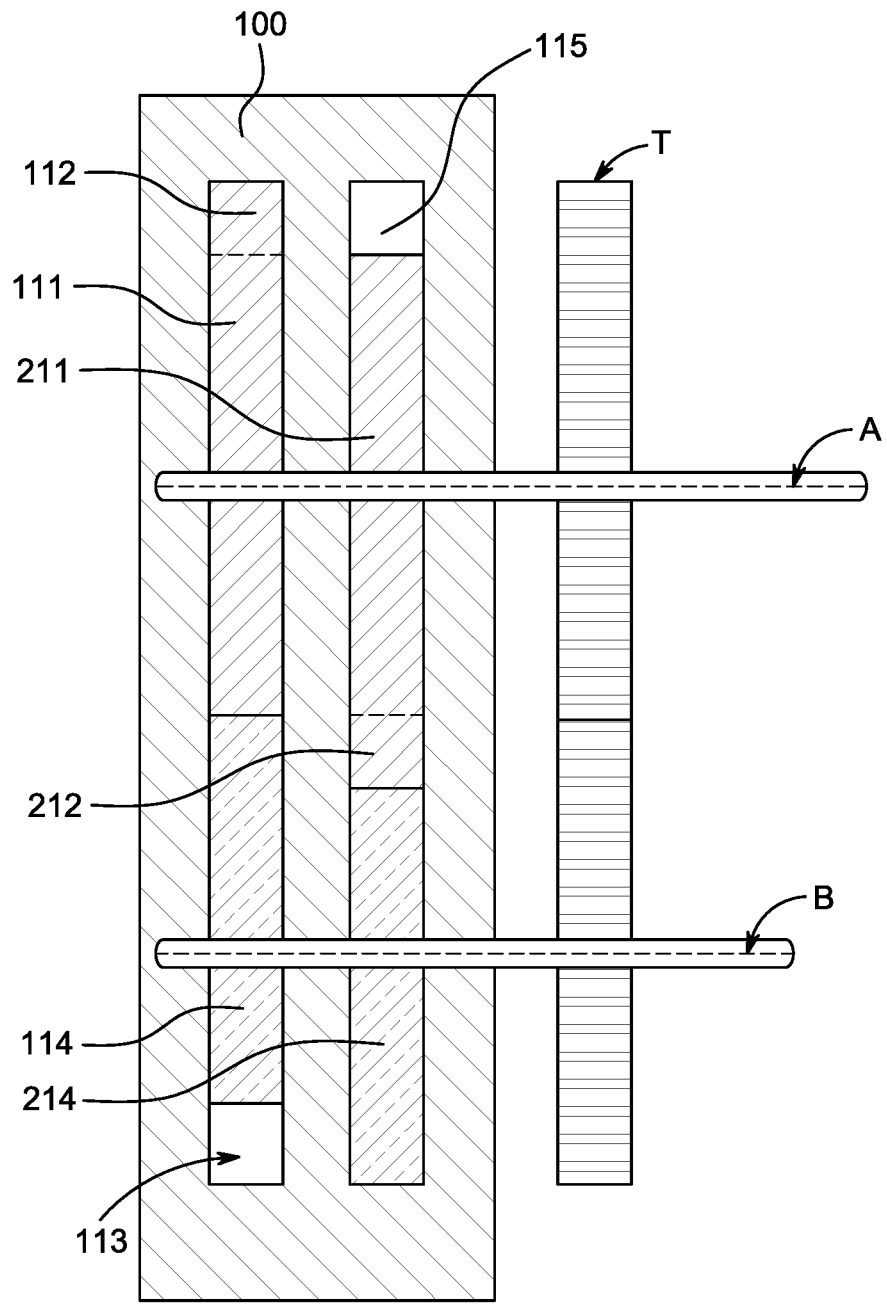
FIG. 3D is a cross section view of an arrangement of two rotary drive apparatus coupled together in a housing.

For example, FIG. 3C shows an embodiment of the invention in which the trailing face 12a of the projecting rotor element comprises a shape which reduces or mitigates drag in the fluid. In this example, the shape is a complex shape in the trailing face 12a of rotor element 12. The hindmost edge 12x of the complex shape extends from the surface 16 in a smooth curve to the outermost point 12y of the projecting rotor element 12. Such a complex shape to one or both faces of the projecting rotor element may improve efficiency. In general, the complex shape could be on one or both sides 12a and 12b for turbines, combustion engines and pumps/respirators. FIG. 4B shows an example comprising a complex shape on both faces 12a and 12b of the rotor element 12. In FIG. 4B a simple shape for a rotor element 12 is shown dashed for comparison, and to aid understanding of the invention, while the general position of inlet 18 and outlet 19 behind the complex shapes is also shown dashed. A complex shape may reduce stroke volume, while improving fluid flow and reducing or mitigating drag. Such a complex shape may incorporate shoulder(s) adjacent to the rotor element, these shoulder(s) may serve to close inlet(s) and outlet(s) at certain parts of the cycle as is described further below. In general, the inlet(s) and/or outlet(s) may be on either side of the chamber 15, and not just on one side as shown in the drawings.

It is preferable that any fixed point on respective rotor surfaces 16 and 17 travel at the same relative speed. This avoids unnecessary friction and therefore loss of efficiency.

Two or more rotary drive units may be linked, and the respective orientations of the rotors 11 and 14 offset, so that a unit in the "power mode" of a cycle is offset to a unit which is not presently providing power. This is expected to provide a smoother function of the system. For example, two coupled units would have the orientations of their respective rotors 11 and 14 offset by 180°, three units by 120°, four units by 90° etc. An example of this is shown in FIG. 3D. Two units inside a housing 100 share shafts A and B, and are coupled by a timing belt or toothed mechanism T. The rotor 112 of the first unit is in a disengaged upper position, and rotor 111 contacts rotor 114. Recess 113 has travelled to the bottom of the unit. At this position, the rotor element 212 of the second unit occupies the recess in rotor 214. Thus a part of chamber 115 is visible at the top of the second unit.

Fluid-Driven Rotary Drive Apparatus

An aspect of the invention where the rotary drive apparatus acts as a turbine is illustrated by way of example in the embodiments shown in FIGS. 4A-7. It is believed the invention works efficiently as a turbine because almost all the water is causing a driving force; the only very small amount of energy not captured is that which is in the fluid that slides past the very small clearances at various stages of the cycle.

In some turbine embodiments, the first and second rotor are able to remain in sealing engagement during rotation, i.e. either the rotor element is in contact with the recess, or the surfaces 16 and 17 are in contact with one another. This can prevent the fluid circumventing the rotor element resulting in a loss of power during the lost-contact part of the cycle. Such a loss of power would only be partial, (and could be offset by linking multiple turbines as discussed below) but would decrease the efficiency of the turbine. For a pump embodiment, this decreased efficiency may be of less concern than delivering a smooth flow of fluid.

Figure 4A:
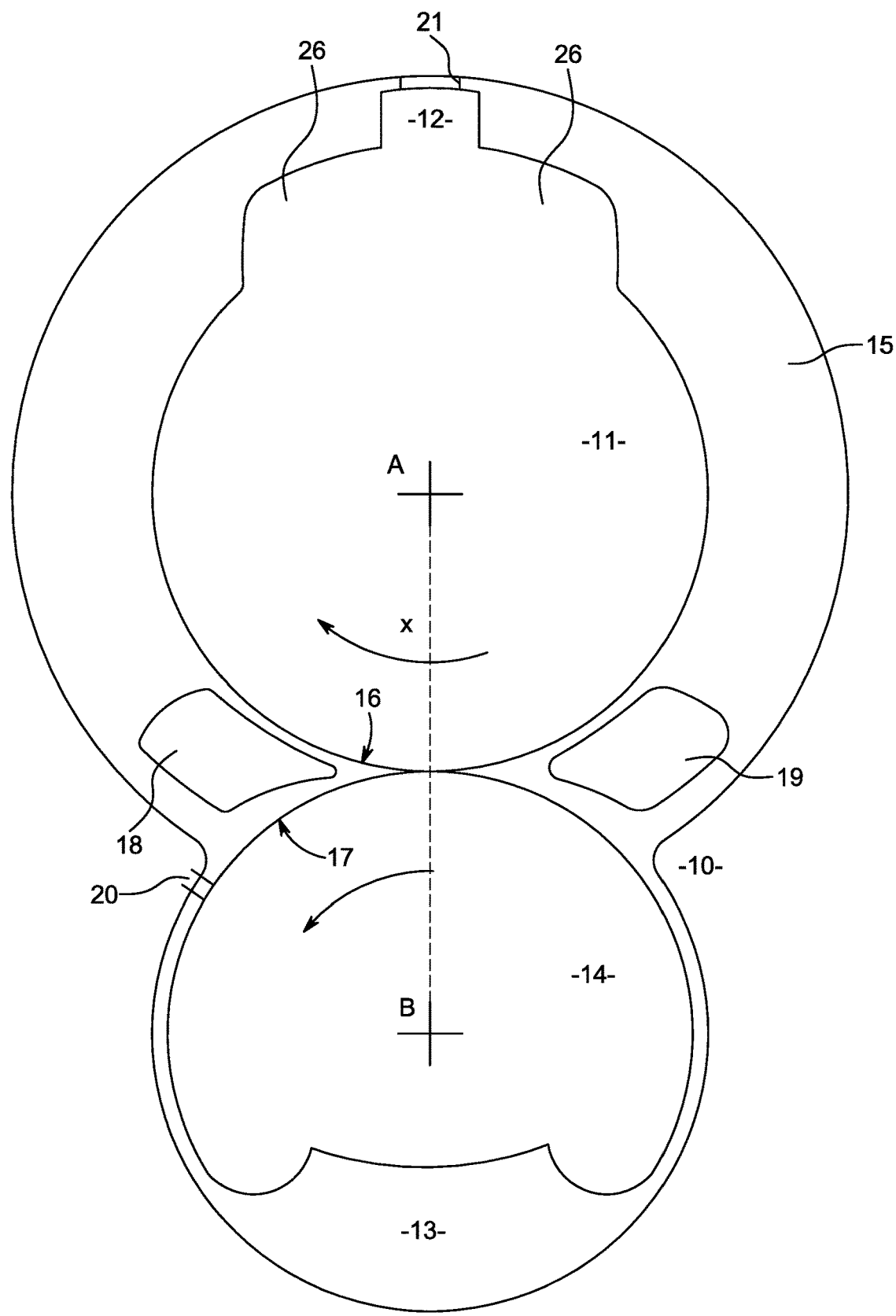
FIG. 4A is a view of the inside of the housing of yet a further embodiment suitable for use with a pressurized fluid medium to provide a turbine.
Figure 4B:
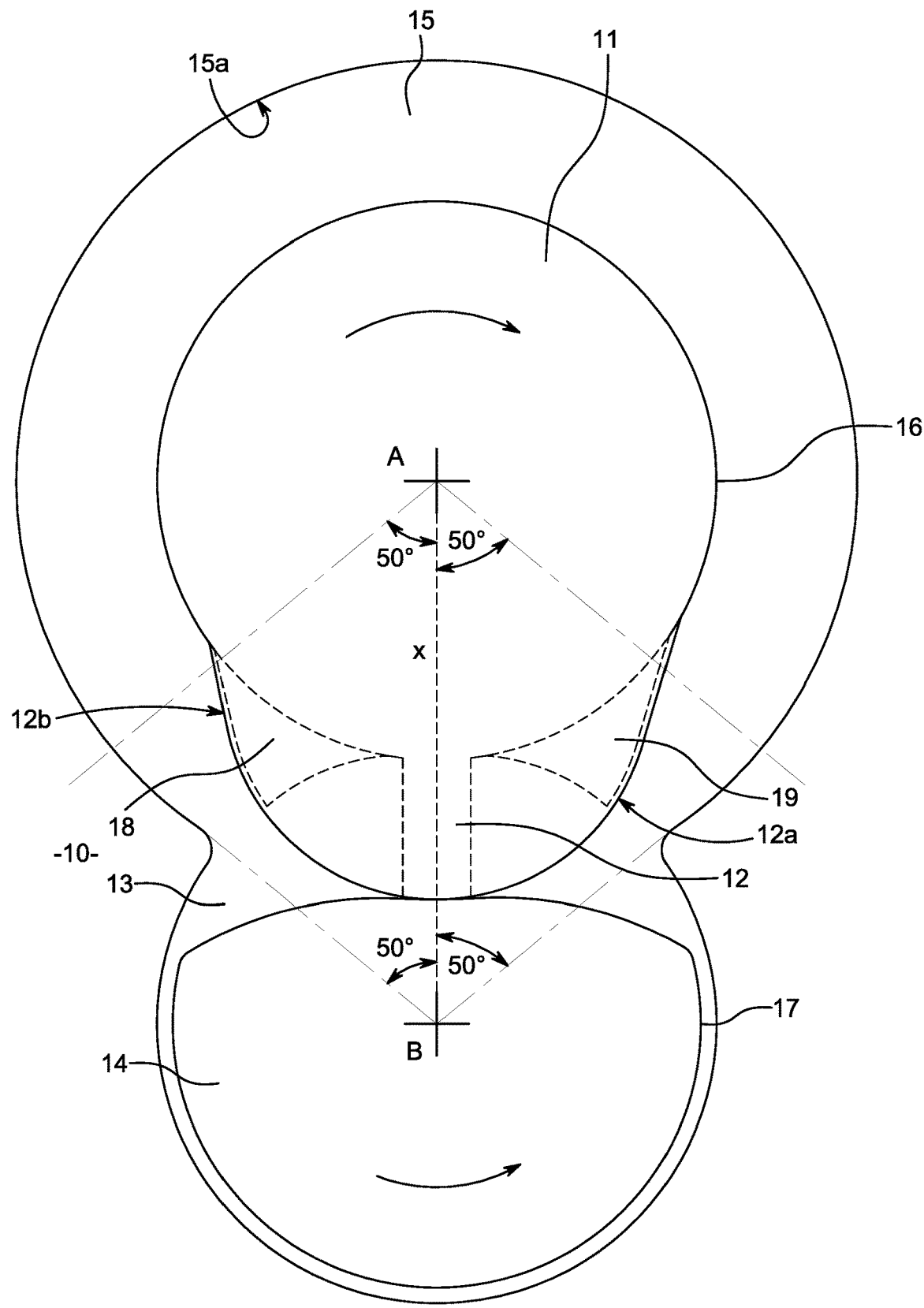
FIG. 4B is a view of the inside of the housing of yet a further embodiment suitable for use with a pressurized fluid medium to provide a turbine, in which both faces of the rotor element comprises a shape which reduces or mitigates drag in the fluid.
Figure 5:
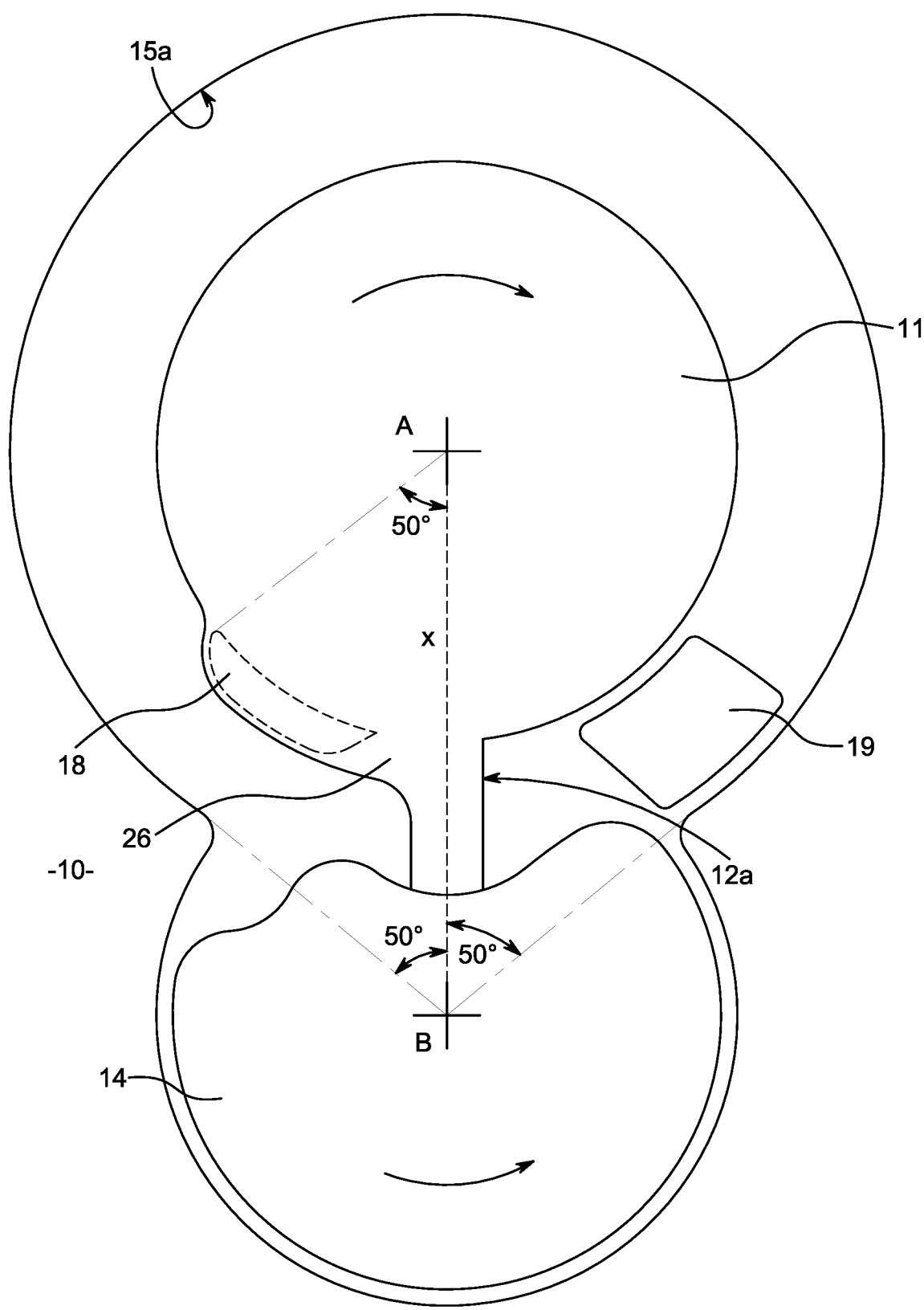
FIG. 5 is a view of the inside of the housing of an alternative embodiment suitable for use with a pressurized fluid medium to provide a turbine.

Referring to FIGS. 4A, 4B and 5, fluid pressure is introduced to chamber 15 by inlet port 18 and exits chamber 15 via outlet 19. Fluid pressure is provided from a fluid source including water or steam, for example as a hydro or steam-driven turbine. In this way, the rotor element acts as a driving element to drive rotation of the first rotor. In a clockwise rotational axis embodiment (of rotor 11) as illustrated it is preferable that inlet 18 be situated at approximately 7 or 8 o-clock (i.e. +30° to +60°) around axis A with respect to line X, and outlet 19 is at 4 or 5 o-clock (i.e. −30° to −60°) around axis A, with respect to line X. This provides the greatest "stroke" (being the arc for which power is applied, or gas or fluid is being forced out of chamber 15), however other positions may be possible in future embodiments.

Preferably a powered cycle would begin with rotor element 12 at a position just above inlet 18, for example at +60° to +90° around axis A with respect to line X (i.e. 8 or 9 o'clock). At this position the walls 16 and 17 are in sealing engagement 'behind' inlet 18 such that fluid pressure is imparted to trailing face 12a of rotor element 12 thereby pushing rotor 11 in the clockwise direction indicated in this example. Rotor 11 is further mounted on a drive shaft A (FIG. 2), the rotational energy of which can be put to further use, including use to generate electricity using an electric generator in the conventional way.

When projecting rotor element 12 reaches the outlet 19, centripetal motion will continue to spin both rotors 11 and 14 past the engagement of rotor element 12 within recess 13 and a new cycle begins.

When compared with FIG. 1, in FIGS. 4A, 4B and 5 rotor 11 includes additional shoulder(s) 26 at the base of rotor element 12. Where the rotor 11 includes a shoulder, the inner junctions 121, 122 of rotor element 12 are not present, because the rotor element 12 does not join directly to wall 16 of rotor 11. However, the shape of the rotor element can still be described by reference to a notional inner junction. Shoulders 26 can have the effect of being a closure valve over inlet 18 at certain stages of the cycle in order to improve the success and efficiency of steam and water driven turbines. In some embodiments, shoulder(s) 26 can provide strength to the rotor element. For example, in a turbine embodiment, the shoulder can act as a buttress to resist the pressure applied to the rotor element. In such an embodiment the shoulder can be described as a flange. In FIG. 4A shoulders 26 cover the inlet 18 and outlet 19 as rotor element 12 engages with recess 13 of rotor 14. In a turbine embodiment, the use of two shoulders 26 on either side of the rotor element 12 is advantageous because as the rotor rotates, inlet 18 is covered by the preceding shoulder at the same time as outlet 19 is uncovered by the trailing shoulder, thus providing a constant flow through the turbine. The exact shape of shoulders 26 relative to inlet 18 and outlet 19 can be adjusted to provide complete coverage of inlet 18 and incomplete coverage of outlet 19. This provides more free movement of fluid exiting chamber 15 and avoids a pressure build-up.

Referring to FIG. 4B, line X drawn between shafts A and B is shown dashed, and further dashed lines are shown extending from both axes A and B, on either side of line X and making angles of +50°, −50° with line X. In the Figures, these dashed lines help to illustrate the relationship between parts and aid understanding of the invention. For example, in FIG. 4B, inner leading junction 121 and inner trailing junction 122 make angles of approximately +50°, −50° with line X. Inner leading junction 131 and inner trailing junction 132 of recess 13 align with these lines from axis B, and thus make angles of +50°, −50° with line X.

The shapes of inlet 18 and outlet 19 themselves can also be adapted. In FIGS. 1-11 they are shown schematically and on the principle that inlet 18 and outlet 19 should not be covered by rotors 11 and 14, only intermittently by rotor element 12 and shoulder(s) 26 if present. However, in preferred embodiments, the shapes of inlet 18 and outlet 19 are as shown in the drawings.

In FIGS. 4A and 4B the inlet 18 is located on the back wall of chamber 15 adjacent the engagement of peripheral walls 16 and 17. A further sealing means 20 is shown between the second rotor and the housing to maintain the integrity of chamber 15. However, in some embodiments the sealing means 20 may not be necessary or beneficial, especially if clearances between housing 10 and wall 17 are extremely small.

FIG. 5 illustrates a further embodiment having only one shoulder 26, shaped to cover inlet 18. In this Figure, at an engaged position where outer leading junction 123 and outer trailing junction 124 are equidistant from line X, the area for locating inlet 18 is within a corresponding shape of shoulder 26, and is described by a dashed line extending from axis A and making an angle of +50° with line X. The area for locating outlet 19 is described by dashed lines extending from shafts A and B, each making an angle of −50°, +50° respectively with line X. When rotor element 12 is at the position shown, inlet 18 is blocked by shoulder 26 and no fluid (water) can enter the housing via inlet 18 and the rotors are turning due to momentum from the previous cycle. Once rotor element 12 passes inlet 18, fluid entering via inlet 18 adds pressure to surface 12a of rotor element 12 and the exposed surfaces of rotor 14 at the same time, thus driving the next cycle.

As may be appreciated, further seals may be provided to increase efficiency. For example, linear seals 20 could be provided between the wall 17 of rotor 14 and the wall of housing 10 as is illustrated by FIG. 4A. However, as discussed above, in embodiments where clearances between wall 17 and housing 10 are very small, sealing means may not be necessary and may actually reduce efficiency.

A further means of increasing efficiency is to provide one or both of the flat faces of each rotor with a seal such as an O-ring in a track rebated into the rotor and extending around the rotor near the perimeter of said face.

When used as a turbine utilising the power of high-pressure water or steam generated from e.g. coal, oil, nuclear or geo-thermal energy, it would be possible to include valves on the inlet 18 (not shown) to close the intake momentarily as the projecting rotor element 12 rotates from the outlet 19 to a point immediately past inlet 18 (e.g. 9 o'clock). In most cases it is not necessary to use valves on outlet 19 as it is merely allowing the escape of gas/water as the projecting rotor element 12 is forced around in the next cycle.

Inlet valves may be activated by a cam driven from the other moving parts in relation to the stage of the cycle. Inlet valves may not be required, and are not shown in FIG. 5 or 6.

Figure 6:
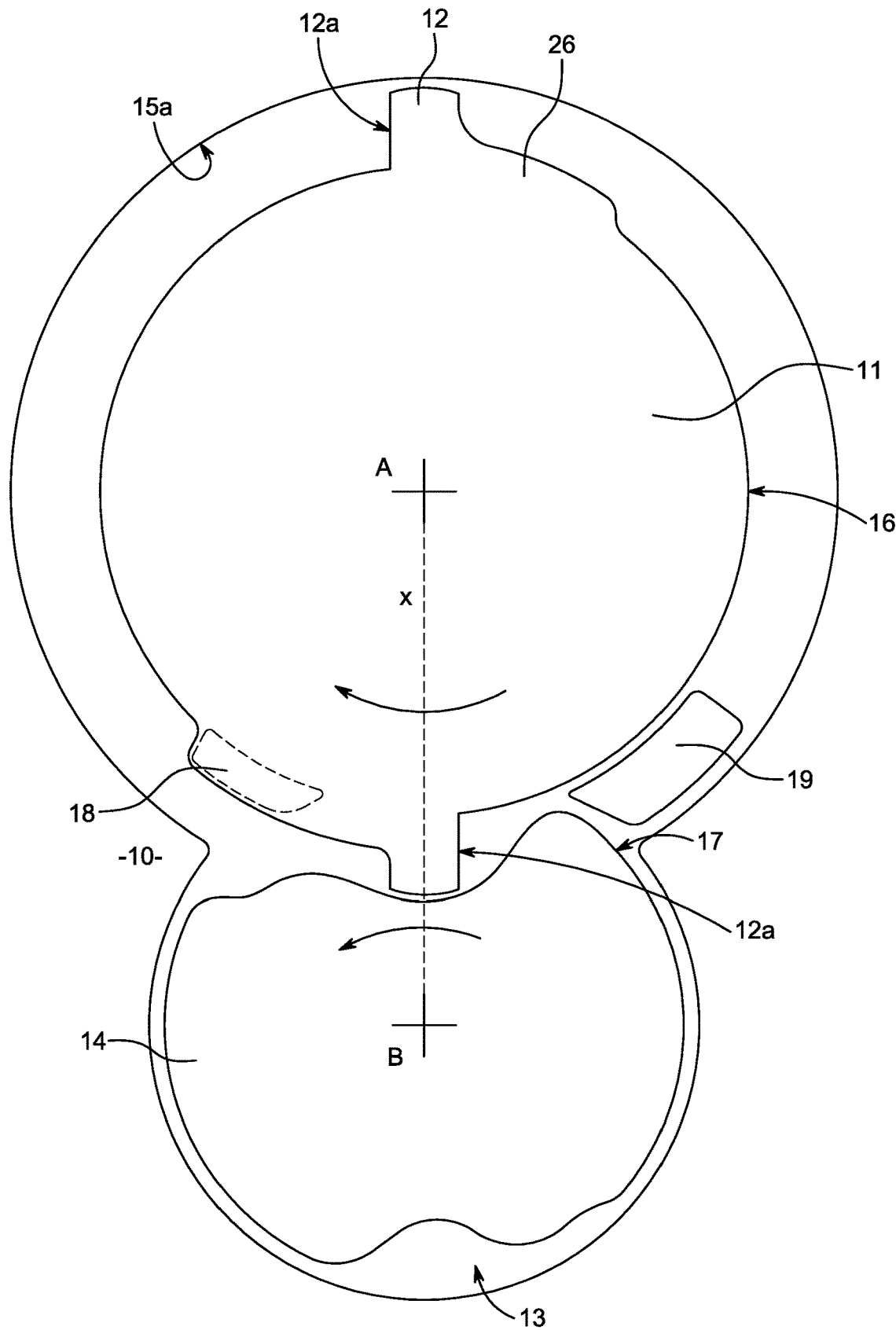
FIG. 6 is a view of the inside of the housing of a further embodiment of the present invention suitable for use with a pressurized fluid medium to provide a turbine.

FIG. 6 illustrates a further embodiment where there are two recesses on rotor 14 and two projecting rotor elements 12, having faces 12a which receive force on rotor element 12 from the fluid entering chamber 15. Thus the two recesses in the second rotor accommodate the two rotor elements and maintain sealing engagement when the rotor elements engage with the recesses.

This arrangement may improve efficiency by removing eccentricity of the rotors and improving the balance of rotors 11 and 14. This is particularly advantageous when extremely high revolutions per minute are required.

Figure 7:
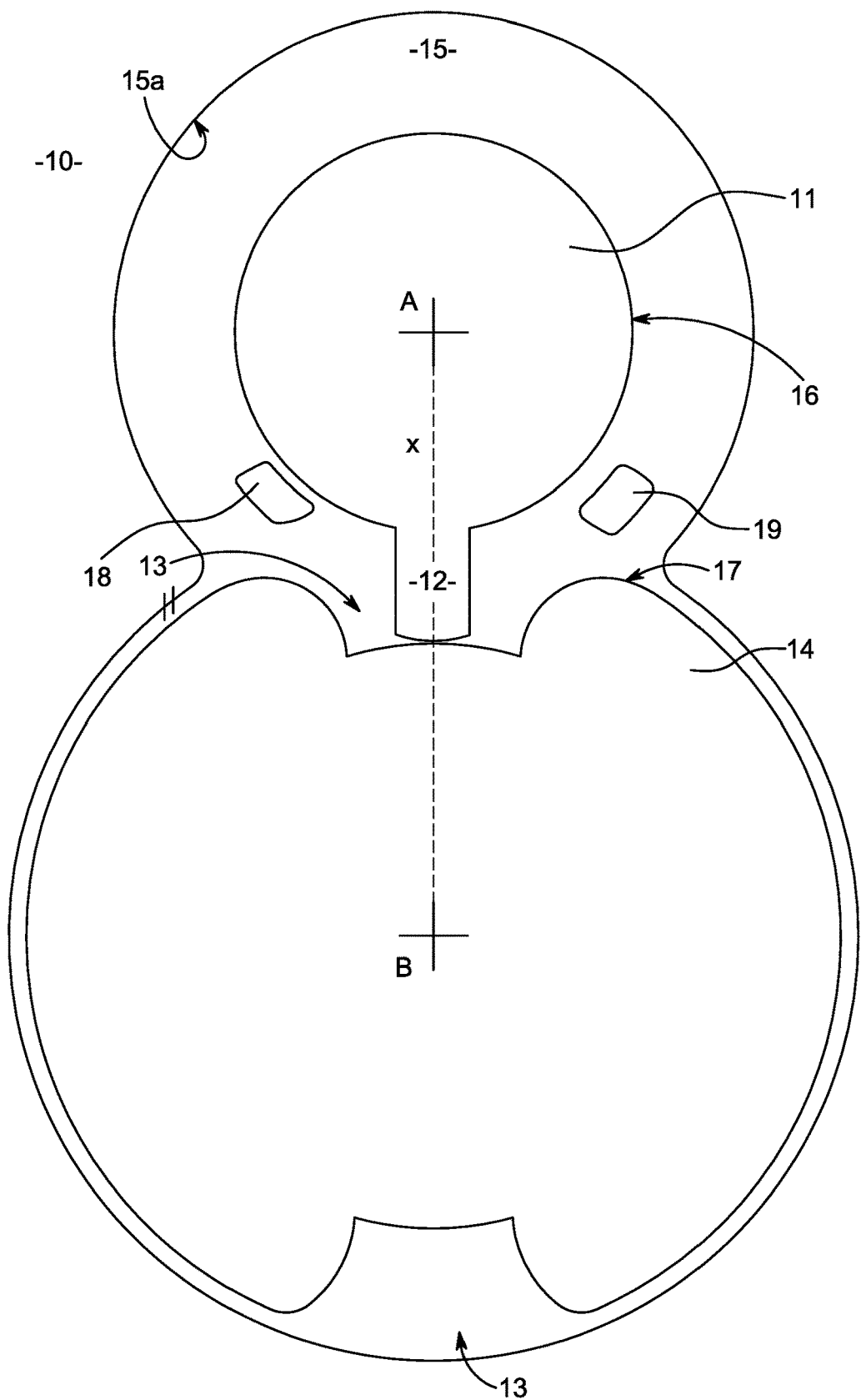
FIG. 7 is a view of the inside of the housing of a further embodiment of the present invention suitable for use with a pressurized fluid medium to provide a turbine.

FIG. 7 illustrates a further embodiment where rotor 14 is substantially twice the diameter of rotor 11, necessitating two recesses 13 on rotor 14. It can be noted the principle of multiplying the diameter of one or other of the rotors can also be applied to the other preferred embodiments of the invention, the combustion engine and the respirator pump.

Rotary Drive Apparatus as a Pump

Figure 8:
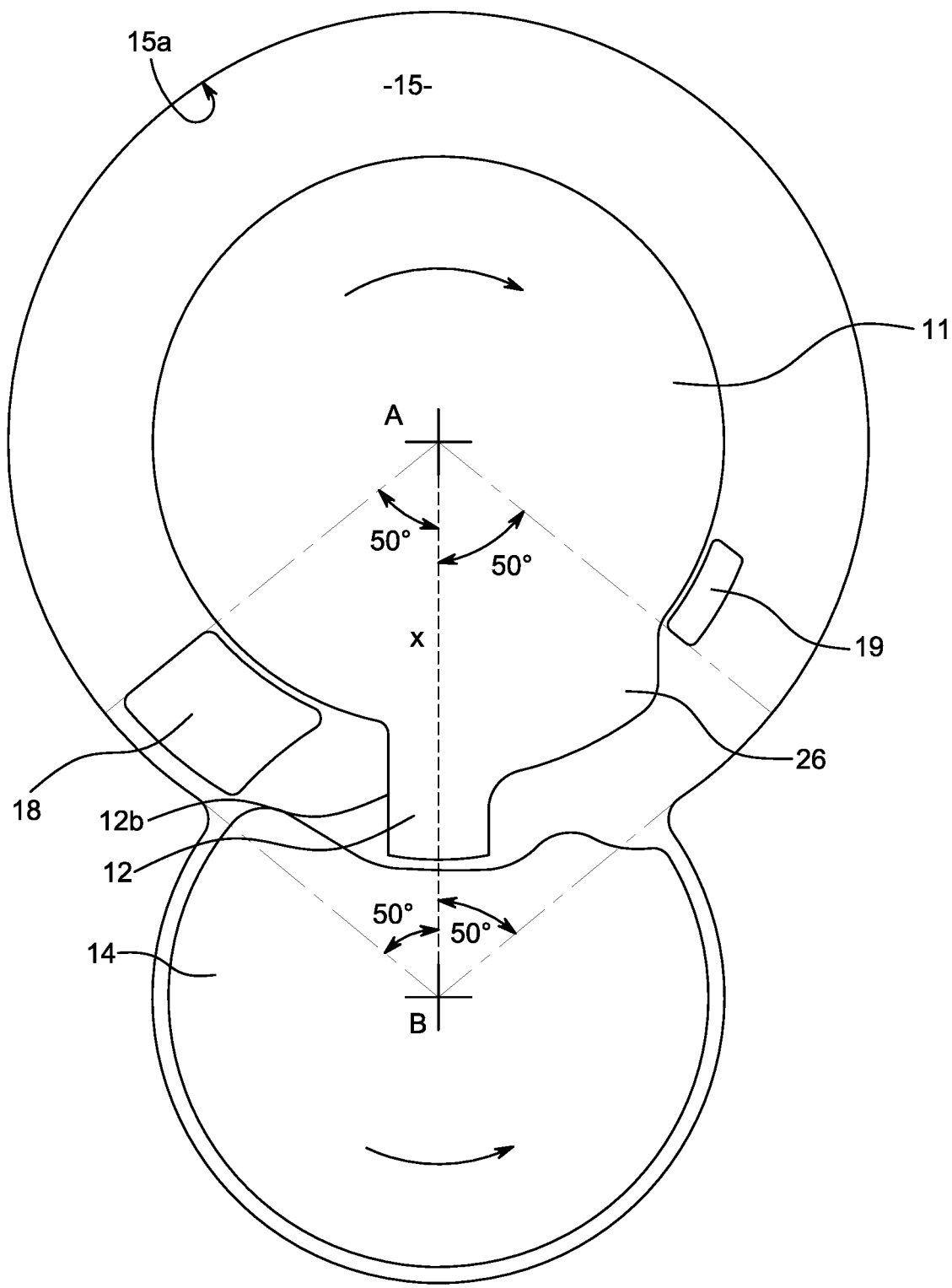
FIG. 8 is a view of the inside of the housing of a further embodiment of the present invention suitable for use as a pump, such as a respirator pump.
Figure 9:
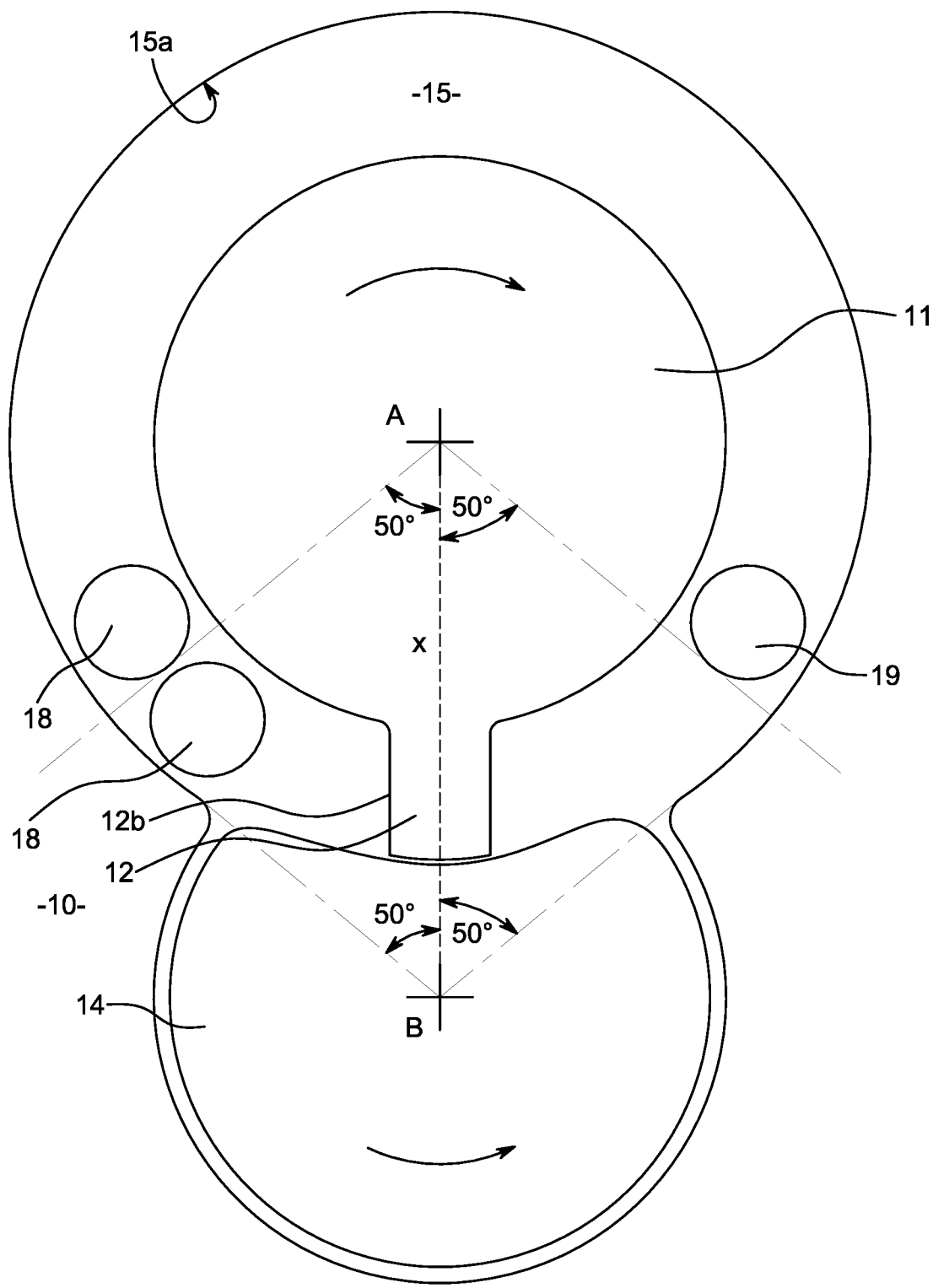
FIG. 9 is a view of the inside of the housing of a further embodiment the present invention suitable for use as a pump, such as a respirator pump.

Another aspect of the invention where the rotary drive apparatus provides a pump, such as a water or respirator pump is illustrated by the embodiments shown in FIGS. 8 and 9. This aspect of the invention also has application as a condenser apparatus.

If rotational motion is externally applied via a drive shaft to rotor 11 or 14 while connected to a fluid reservoir (water, gas or air) at inlet 18, then the apparatus acts as a pump. As shown in FIG. 8, a fluid such as air or an air-oxygen mixture is drawn through inlet 18 and pushed around chamber 15 by face 12b of rotor element 12, to outlet 19 at a pressure defined by the rotational speed of rotor 11. In FIGS. 8 and 9, during rotation of the first rotor a shoulder follows the rotor element, and occludes the outlet during part of a cycle of the first rotor, useful in a high speed pump embodiment.

Optionally in a pump embodiment or a respirator embodiment, the first and second rotor are able to remain in sealing engagement during rotation, i.e. at any stage of the rotation, either the rotor element 12 is in contact with the recess 13, or the surfaces 16 and 17 are in contact with one another. However in some embodiments the first and second rotor do briefly lose contact with one another during a part of the rotation, (e.g. if the rotor element 12 loses contact with the recess 13). At such a stage of the rotation there may be a decrease in the volume of fluid/air drawn by the pump/respirator. Drawing of fluid/air will return to maximum level at the next stage of the rotation when the seal between the first and second rotor is re-established.

Examples are discussed in more detail as follows.

Example: Pump Embodiment of FIG. 8

In FIG. 8, inlet 18 is located inside the sector defined by a dashed line extending from shaft A and making an angle of +50° with line X, while outlet 19 is located outside the sector defined by a dashed line extending from shaft A and making an angle of −50° with line X. This arrangement provides a maximum pressure on the fluid/gas exiting outlet 19, until the outlet 19 is occluded by rotor element 12 and shoulder 26, after which the seal between the rotors is removed as the rotor element 12 loses contact with the recess 13. Pressure on outlet 19 will resume once the seal between the rotors is re-established. It is expected that the embodiment of FIG. 10 will be particularly suited to higher speed rotations, such as a high pressure pump. Such a pump may not require any seals, having very small clearances.

Example: Pump/Respirator Embodiment of FIG. 9

The embodiment of FIG. 9 comprises two inlets 18, and is more suitable for a low speed pump such as a respirator. One of inlets 18 is located inside, and one outside the sector defined by a dashed line extending from shaft A and making an angle of +50° with line X. This arrangement means once the rotor element 12 reaches the first inlet 18, rotors 11 and 14 are in sealed engagement, and so the new gas can begin to be drawn in. This also prevents a vacuum being created once the rotors 11 and 14 seal behind the rotor element 12. An alternative arrangement could be to have the two inlets radially aligned with respect to rotor 11, requiring a smaller size for each of the inlets. Optionally such a pump could have rubberised seals incorporated into the design. The embodiment of FIG. 9 comprises a one-way valve on outlet 19 which can seal as rotor element 12 passes outlet 19. The sealing of outlet 19 would prevent back-pressure from forcing the fluid back into chamber 15. In relation to outlet 19, a one-way valve can either contact the body 10 of the apparatus, or be separate to the apparatus. Outlet 19 is located outside the sector defined by a dashed line extending from shaft A and making an angle of −50° with line X.

The choice of application of rotational motion to either rotor 11 or rotor 14 provides flexibility in configuring the apparatus of the invention as part of a pump such as a respiratory device.

In embodiments a pump for a respirator could be provided with two inlets for air and oxygen respectively (as is shown in FIG. 9), allowing for provision of air/oxygen mixture to a patient. The use of two inlets allows for a more precise air/oxygen mixture and also provides the option of being able to be adjusted in real-time, which is advantageous for a respirator embodiment.

Rotary Drive Apparatus with Wide Rotor Element

FIGS. 10-13 show a rotary drive apparatus with a wide rotor element. While the embodiments shown in these Figures are suitable as a turbine or a pump, a combustion engine with a wide rotor element is also discussed below. In the embodiments of FIGS. 10-13, rotor 11 and rotor 14 have the same radius, and the rotor element 12 extends radially beyond the rotor 11 by a distance of about 30% the radius of rotor 11 or 14.

In general, a wide rotor element is one which, in the engaged position shown in FIGS. 10-13, occludes both inlet 18 and outlet 19 at the same time. In this way, escape of fluid around chamber 15 is avoided. Since inlet 18 is positioned by a line making a positive angle with line X in a range of about +30° to +90°, preferably +30° to +60°, and outlet 19 is positioned by a line making a negative angle with line X in a range of about −30° to −90°, preferably −30° to −60°, this means the rotor element generally occupies a sector of between about 60° and about 180°, preferably between about 60° and 120°, and all of the junctions would fall within this sector. For example, the wide rotor element can preferably occupy a sector of about 60°, 70°, 80°, 90°, or 100°. Preferably, the rotor element occupies a sector of about 80°. This provides a degree of coverage which strikes a balance allowing coverage of both inlet 18 and outlet 19 at the same time, while maintaining the stroke volume of chamber 15.

Figure 10:
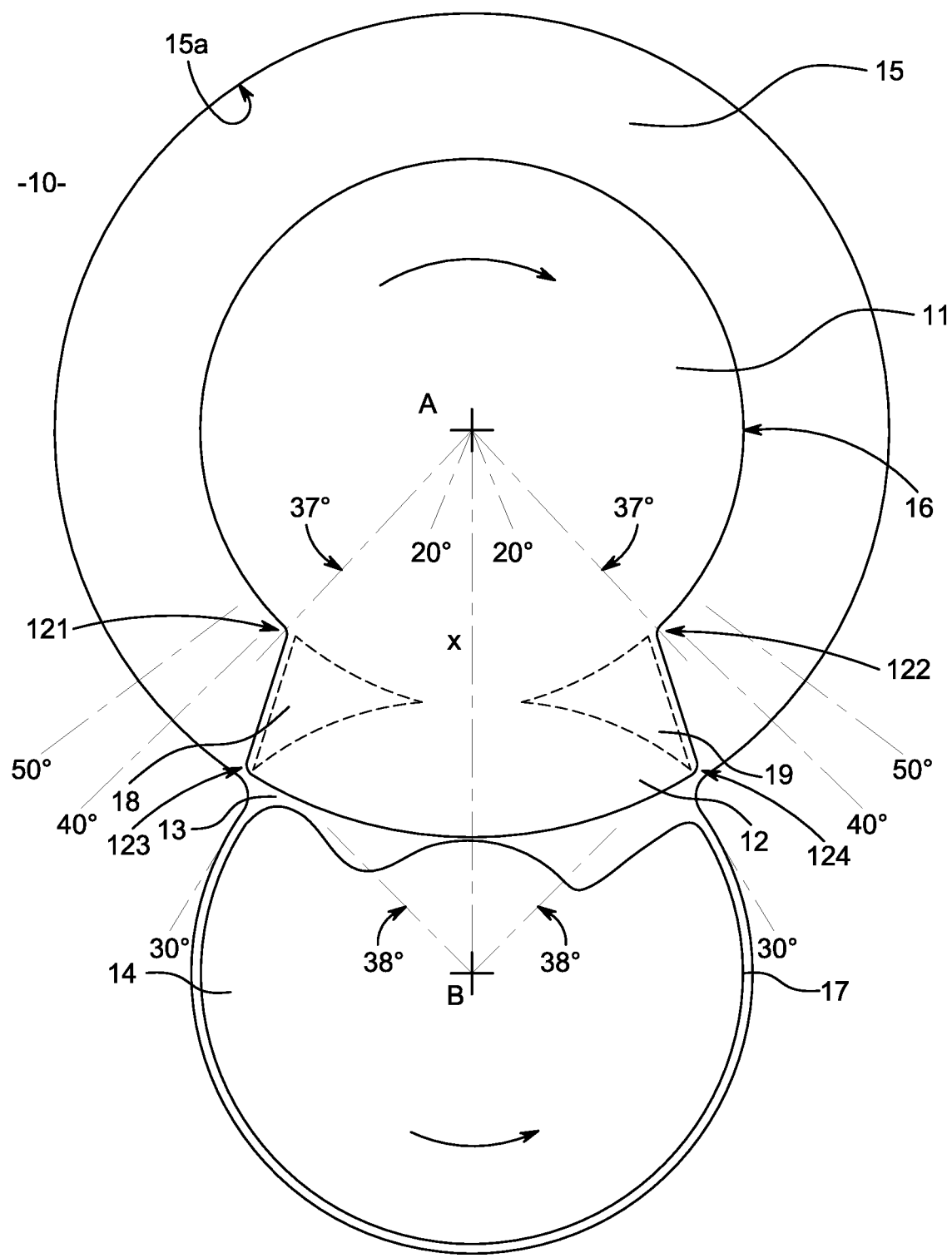
FIGS. 10, 11, 12A, 12B and 13 show a view of the inside of the housing of further embodiments of the present invention suitable for use as a pump or turbine.

In FIG. 10, the inner junctions 121, 122 of rotor element 12 are located by lines extending from shaft A and making angles of +37°, −37° with line X. The trailing face 12a and leading face 12b do not extend radially from rotor 11. Instead, outer junctions 123, 124 are located by a line extending from shaft A and making angles of +30°, −30° from line X. It is expected that a radial orientation for trailing face 12a and leading face 12b would achieve the same result. Turning to recess 13, the inner junctions 131, 132 of the recess are located by a sector extending from shaft B and making angles of +38°, −38° from line X.

The outer surface of rotor 12 being a greater distance from shaft A, this surface moves faster than that of recess 13. Thus, sealed engagement between 12 and 13 does not occur; rather, there is nearly contact between their surfaces, with only a nominal gap between them. Having a slightly smaller angle for the inner junctions 121, 122 compared with the inner junctions 131, 132 (in this case, 37° and 38° respectively, a difference of one degree) also allows the recess to accommodate the rotor element. The near-contact results in some flow through the gap, thus slightly decreasing efficiency. The wide rotor element provides for complete coverage of inlet 18 and outlet 19 at the engaged orientation shown in FIG. 10.

In this example, inlet 18 and outlet 19 are located in the zone through which the rotor element 12 travels, but they avoid the zone through which rotor 14 travels. At the engaged position shown in FIG. 10, both inlet 18 and outlet 19 are occluded by the rotor element. Thus, the location of 18 and 19 is such that the flow is affected by the progress of rotor 11, but not rotor 14.

Figure 11:
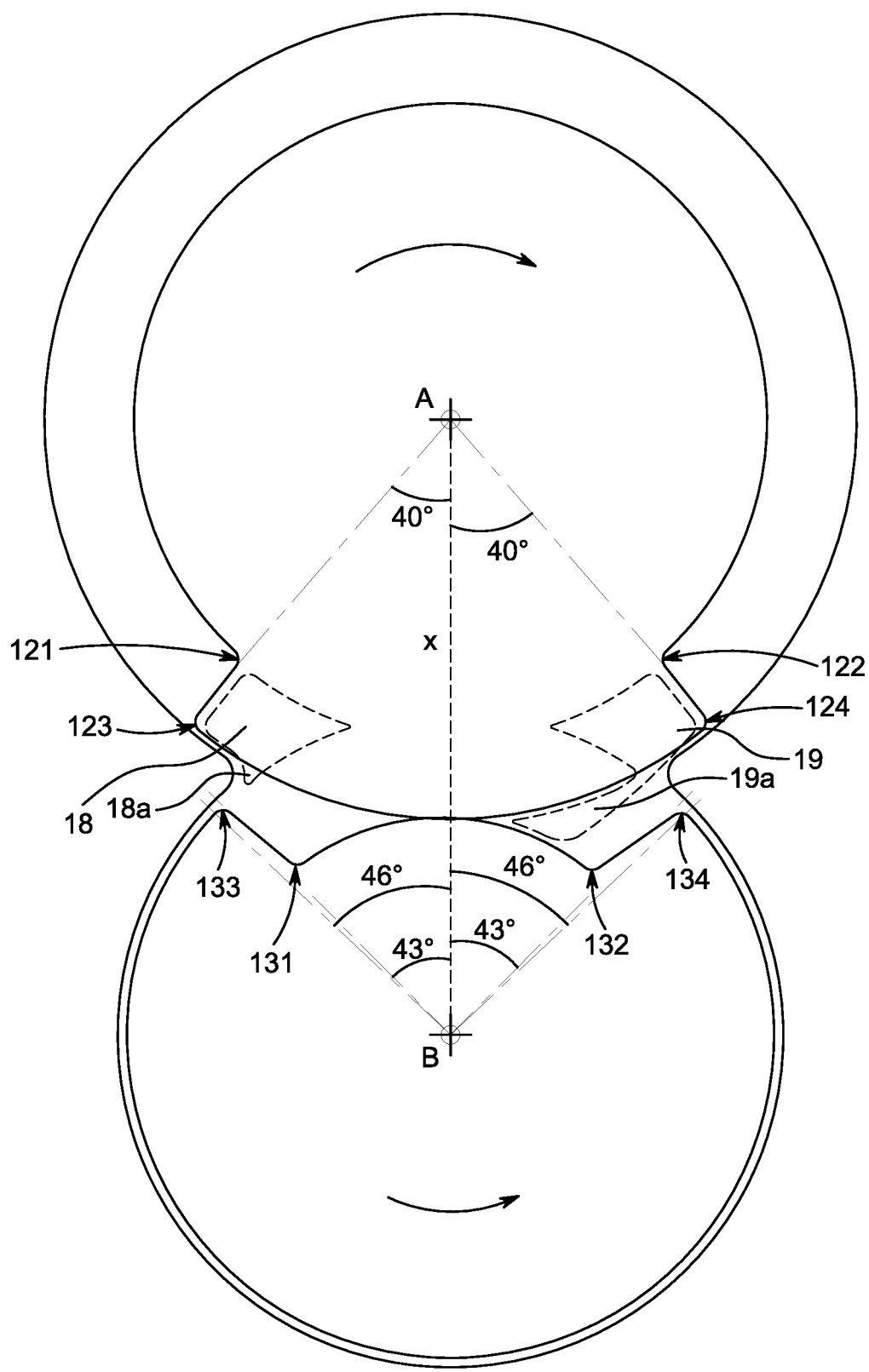

Turning to FIG. 11, in this embodiment the trailing face 12a and leading face 12b do extend radially from rotor 11, and in the orientation shown, align with a line extending from shaft A and making angles of +40°, −40° from line X (as do inner junctions 121, 122 and outer junctions 123, 124). Thus, the wide rotor element occupies a sector of about 80°. Inlet 18 is shaped to avoid the zone through which rotor 14 travels, while an extension to the inlet creates a small venting region 18a. Similarly, an extension to the outlet 19 creates a larger venting region 19a, which extends into the zone of rotor 14. The venting region(s) act to prevent back-pressure from forcing fluid back into chamber 15 which could stall the apparatus, or significantly slow the rotation, thereby providing for a smoother operation of the apparatus.

In the embodiment of FIG. 11, inner junctions 131, 132 are located by a sector extending from shaft B and making angles of +43°, −43° from line X, while outer junctions 133, 134 are located by a sector extending from shaft B and making angles of +46°, −46° from line X. Thus the slightly smaller angle for the inner junctions 121, 122 compared with the inner junctions 131, 132 (in this case, 40° and 43° respectively, a difference of three degrees) also allows the recess to accommodate the rotor element.

Figure 12A:
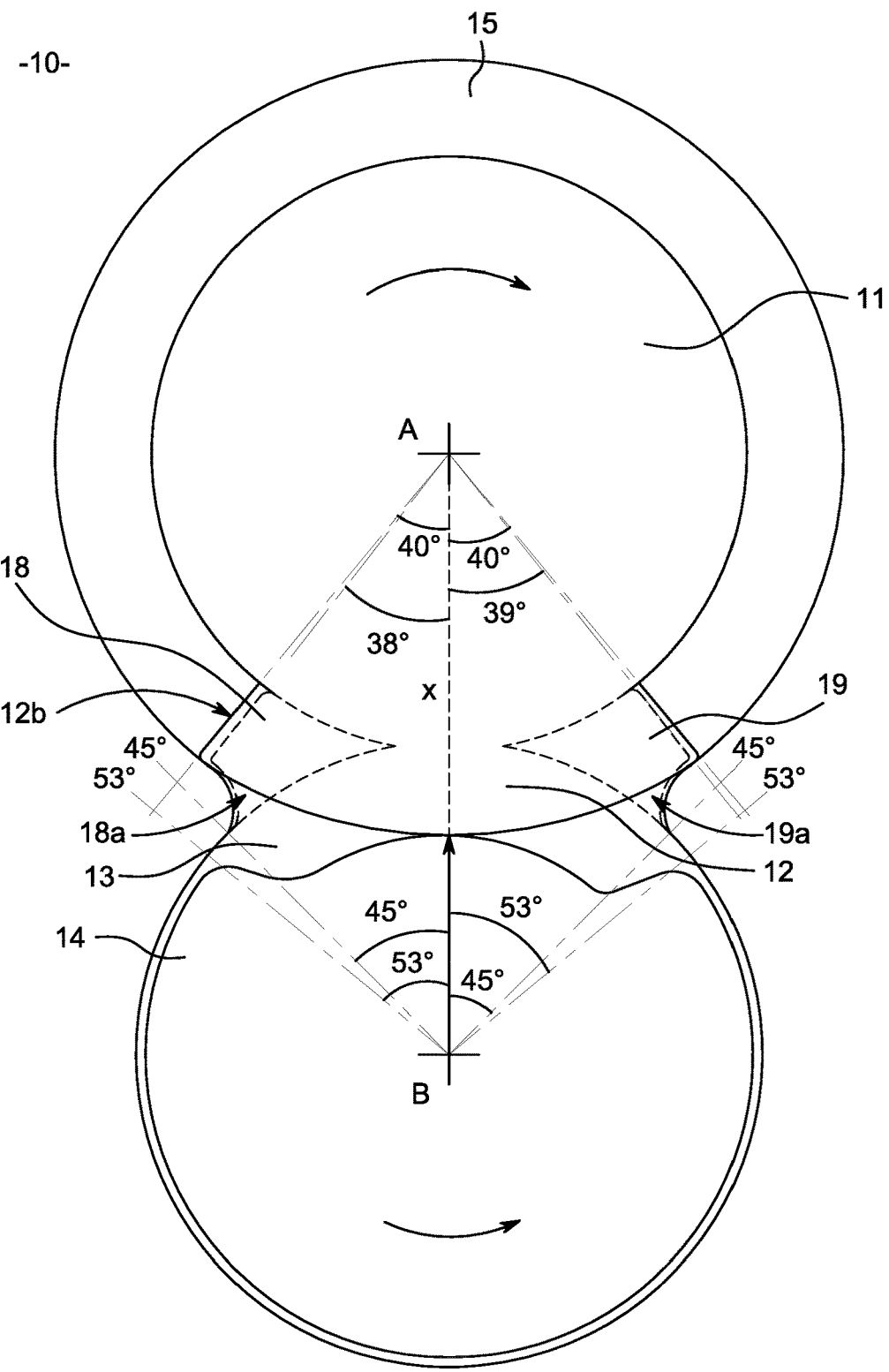

In the embodiment of FIG. 12, as for FIG. 11, the trailing face 12a and leading face 12b extend radially from rotor 11, and in the engaged position shown, align with lines extending from shaft A and making angles of +40°, −40° from line X (as do inner junctions 121, 122 and outer junctions 123, 124). Inlet 18 is within a sector defined by line X and a dashed line extending from axis A and making an angle of +38° with line X. Outlet 19 is within a sector defined by line X and a dashed line extending from axis A and making an angle of −39° with line X. The choice of +38° and −39° degrees respectively to define 18, 19 ensures they are both occluded by rotor element 12 at the engaged position (with the exception of venting regions 18a, 19a as discussed below). As discussed above, closing both of the inlet and outlet ports 18, 19 at the same time prevents escape of fluid around chamber 15, thereby preventing loss of energy.

Inlet 18 is also shaped to avoid the zone through which rotor 14 travels, while an extension to the inlet creates a small venting region 18a. Outlet 19 is also shaped to avoid the zone through which rotor 14 travels, while an extension to the inlet creates a small venting region 19a. Thus in the engaged position shown, inlet 18 and outlet 19 are occluded by rotor element 12 while venting regions 18a, 19a are not. Inlet 18 is preferably slightly smaller than outlet 19, so to avoid back pressure. The relative sizes of inlet 18 and outlet 19 can vary depending on the function of the apparatus. For a turbine, reduction of back pressure is desirable, so the inlet would be smaller than the outlet, whereas in a pump, (or even a condenser), it could be the opposite so as to increase the pressure generated.

Inner junctions 131, 132 of recess 13 are located by lines extending from shaft B and making angles of +45°, −45° with line X. Outer junctions 133, 134 are located by a line extending from shaft B and making angles of +53°, −53° with line X. Thus the slightly smaller angle for the inner junctions 121, 122 compared with the inner junctions 131, 132 (in this case, 40° and 45° respectively, a difference of five degrees) also allows the recess to accommodate the rotor element.

Figure 12B:
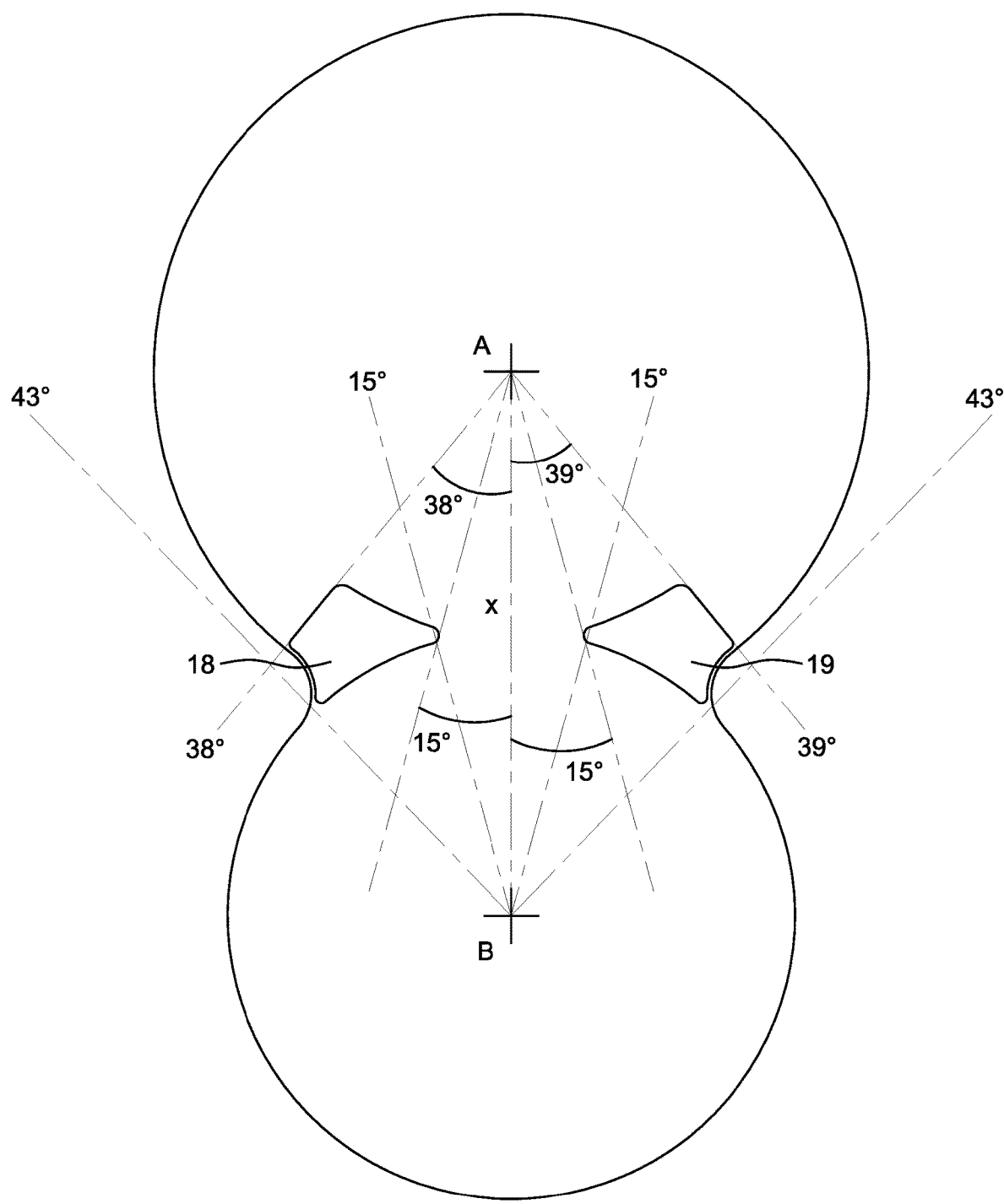

The geometry of inlet 18 and outlet 19 are shown in FIG. 12B. As seen in the Figure, the space between the inlet and outlet is defined by lines extending from the axes of both rotors, and making angles of +15°, −15° with said line X.

Figure 13:
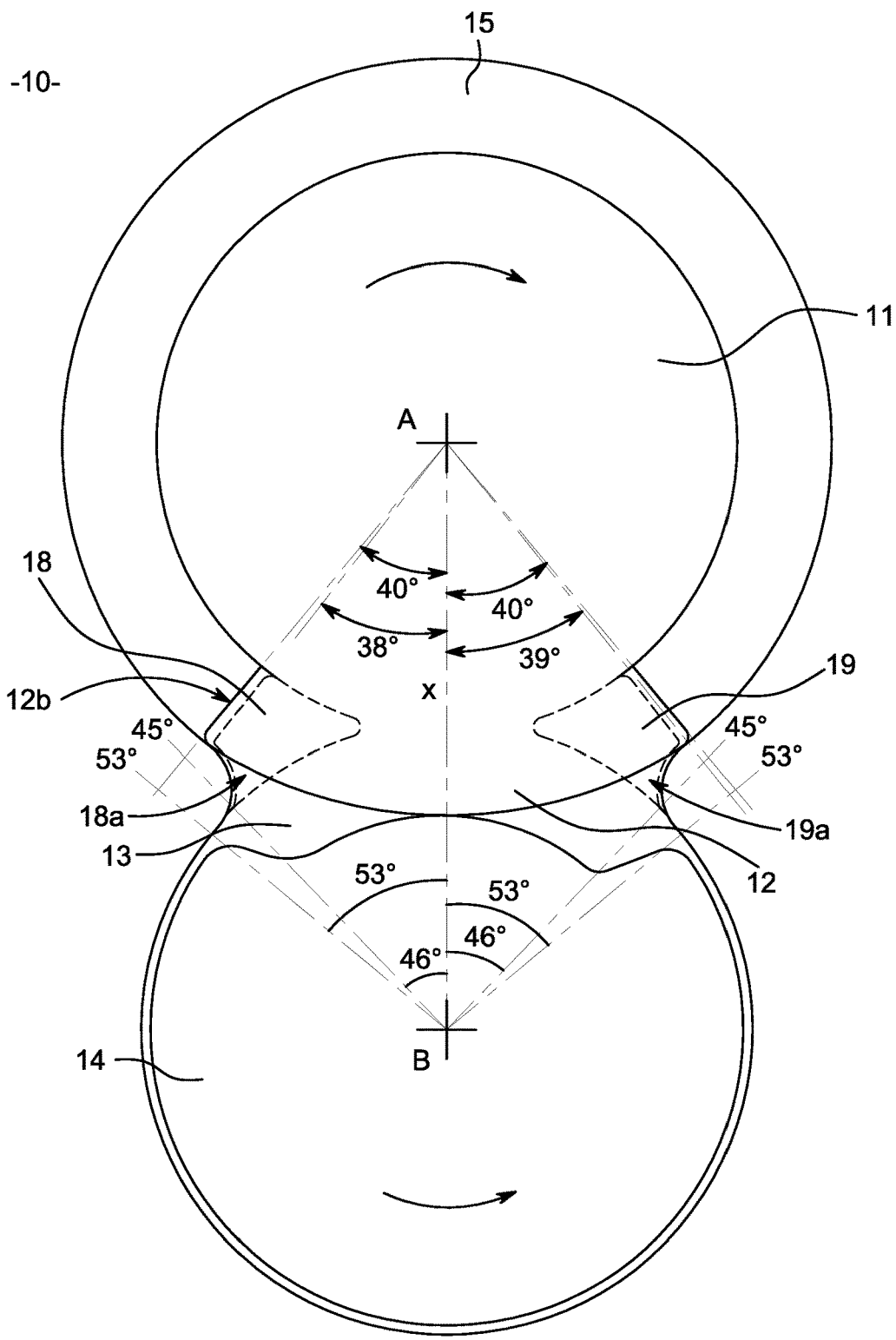

A similar embodiment to that shown in FIG. 12 is shown in FIG. 13. In this embodiment, inner junctions 131, 132 of recess 13 are located by lines extending from shaft B and making angles of +46°, −46° with line X. This provides a slightly wider recess compared to the example of FIG. 12. The other geometry in FIG. 13 is equivalent to that shown in FIG. 12. The apparatus with this geometry works very efficiently as a pump, without any friction occurring.

To operate this apparatus as a turbine, efficiency can be improved by increasing the angle of entry of fluid into the inlet 18. Preferably, the fluid enters inlet 18 at an angle offset from the axis of rotation of the rotor 11, so as to push directly against the rotor element. This minimises the risk of rotor 11 being pushed off its correct alignment. Other ways to reduce eccentricity in a turbine embodiment include drilling holes through both rotors to more evenly distribute pressure on both sides of the rotors.

Combustion-Driven Rotary Drive Apparatus

Figure 14:
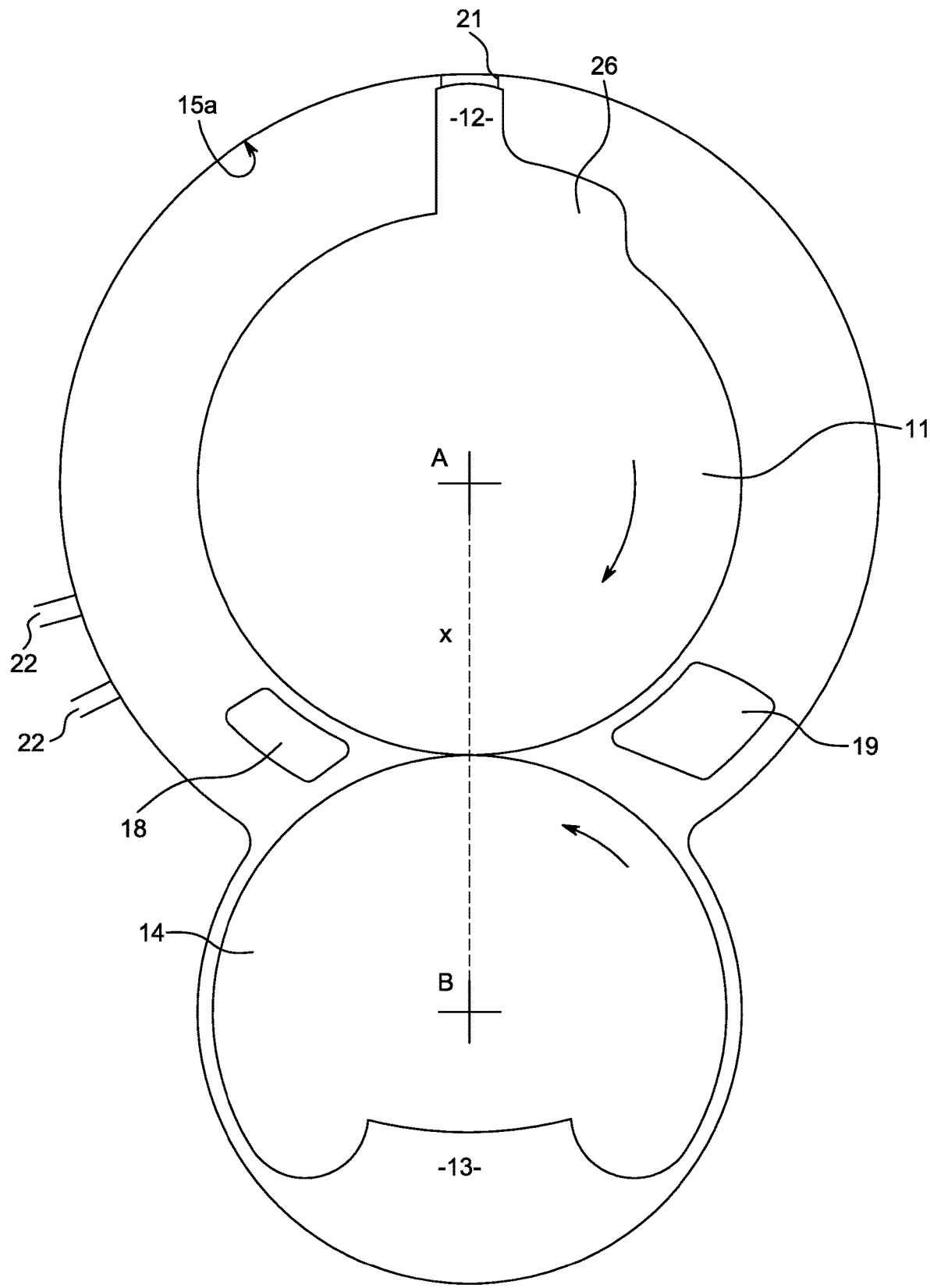
FIG. 14 is a view of the inside of the housing of a further embodiment of the present invention suitable for use as a combustion engine.
Figure 15:
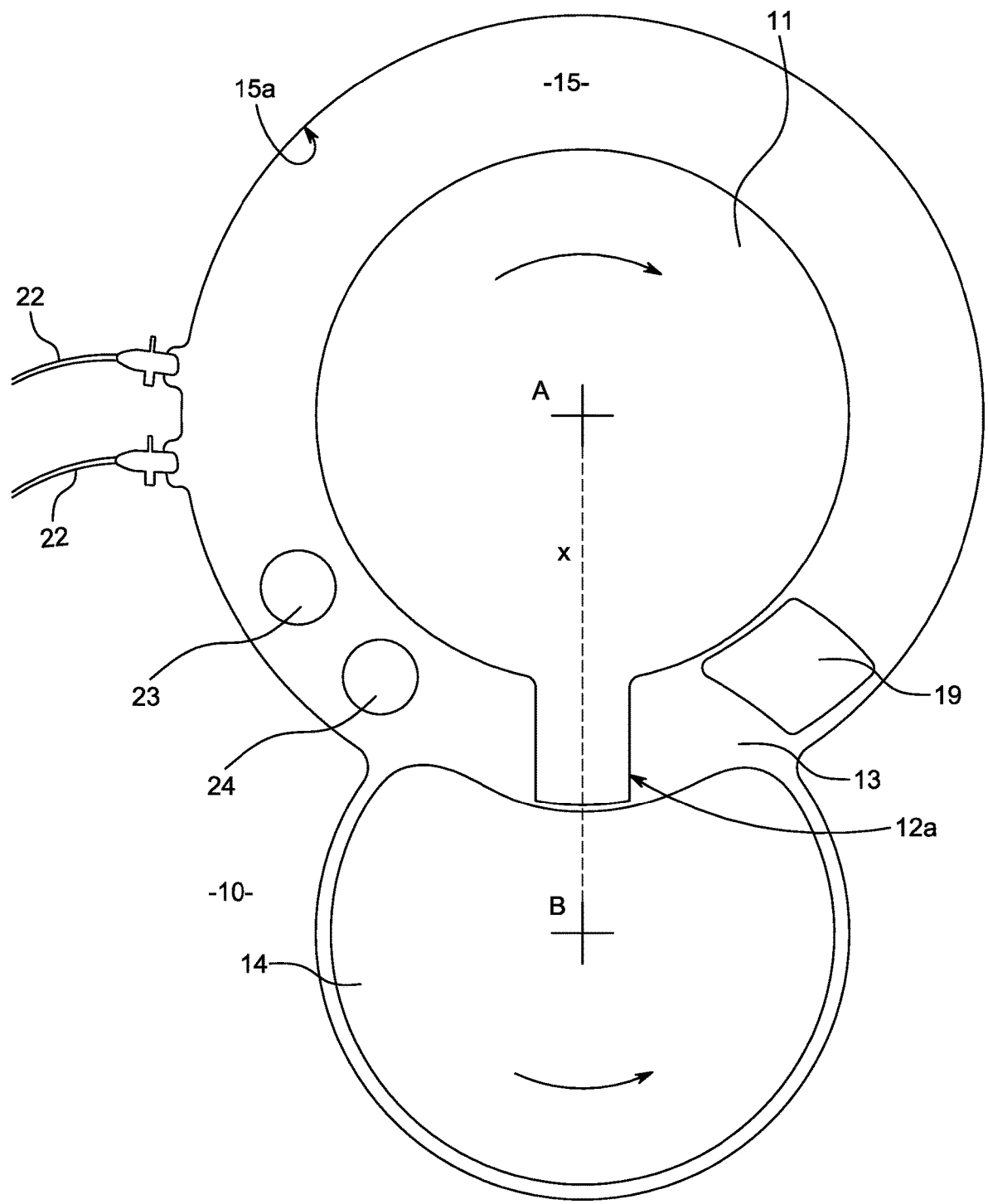
FIG. 15 is a view of the inside of the housing of a further embodiment of the present invention suitable for use as a combustion engine.

Another aspect of the invention where the rotary drive apparatus acts as a combustion engine is illustrated by the embodiments shown in FIGS. 14 and 15. Suitable fuels are apparent and would include petrol (gasoline) or hydrogen & oxygen.

In a combustion engine embodiment, the peripheral walls 16 and 17 of respective rotors 11 and 14 are able to remain in sealing engagement at least during the intake and combustion stages of the cycle, thus providing a confined space for combustion to transfer power to the rotor element. An internal combustion engine additionally requires spark plug(s) 22 and utilises (by example only) two inlets 23 and 24 (not shown in FIG. 14, shown in FIG. 15) which supply a fuel/air mixture as known in the art. This allows for precise air/fuel mixtures, and also provides the option of being able to be adjusted in real-time. Inlets 23 and 24 may be circular one-way valves. Valves will be necessary to control distribution of the mixture at inlet 23 and 24. Inlet valves may be activated by a cam driven from the other moving parts in relation to the stage of the cycle. It should also be noted that as shown in FIG. 15, the chamber wall 15a in the combustion section near the spark plug heads is slightly recessed to allow for rotation of rotor element 12 past the spark plug heads.

Combustion is preferably initiated at the stage of the cycle when segment 12 is at a point just past the last spark plug 22. This will also allow time for adequate mixture of the gases.

The explosion of fuel/air forces rotor element 12 around axis A and drives the shaft upon which rotor 11 is mounted. Exhaust gases exit through outlet 19. It will not be necessary for outlet 19 to include a valve because segment 12 effectively forces out exhaust from the previous cycle when commencing a new cycle.

Two or more rotary drive units may be linked, and the respective orientations of the rotors 11 and 14 offset, so that a unit in the "power mode" of a cycle is offset to a unit which is not presently providing power. This is expected to provide a smoother engine rotation. For example, two coupled units would have the orientations of their respective rotors 11 and 14 offset by 180°, three units by 120°, four units by 90° etc. Some conventional "two-stroke" or "four-stroke" combustion engines with two or more units have their "power mode" offset using such an arrangement of the units.

In a "two-stroke" combustion engine, energy is being lost by having to move pistons up and down. It is believed that in the present invention the energy saved by not having to move pistons up and down will outweigh any loss in efficiency caused by loss of compression past seals etc. In addition, every cycle produces power whereas a four—stroke internal combustion engine requires one cycle to expel waste gas and—draw in a fresh combustible gas mixture.

The size of projecting rotor element 12 and the depth of recess 13 may also be adjusted for proportionally larger thrust. The particular shape of rotor element 12 into recess 13 may also be altered to locate optimum operating characteristics.

Although a shoulder 26 is shown in FIG. 14, it is expected that this will not be necessary in a combustion driven embodiment. Other variations on this alternative 'valve' arrangement may be possible within the scope of the present invention.

It should be noted that in a combustion engine embodiment, using a wide rotor element 12 of the type shown in FIGS. 10-13 may provide better efficiency.

It is believed that the rotary drive apparatus of the present invention can have high efficiency and potentially replace conventional pump, turbine or engine designs. At the least it must be considered an alternative to present methods of construction of "rotary" drive apparatus.

What I claim is:
1. A rotary drive apparatus comprising
   a housing, within which is located
     a first rotor and
     second rotor,
     the first rotor being rotatable about a first axis, having
       an integrally-formed rotor element projecting radially therefrom, the rotor element at least partially occluding an outlet during a first part of the cycle of the first rotor, and a shoulder projecting radially from the first rotor, adjacent to the rotor element, such that the shoulder meets a side of the rotor element and at least partially occludes the outlet during a second part of the cycle of the first rotor, and the second rotor being rotatable about a second axis parallel to the first axis and in a direction opposite to the first rotor, the second rotor comprising a recess able to receive the rotor element, wherein the first rotor and the second rotor and housing define a chamber around the first rotor through which the rotor element passes, the chamber having an inlet and an outlet through which a fluid can enter and exit the chamber.

2. The apparatus according to claim 1, wherein the first and second rotor are able to remain in sealing engagement during rotation.

3. The apparatus according to claim 1, wherein the rotor element does not contact a floor of the recess during rotation.

4. The apparatus according to claim 1, further comprising sealing means able to form a seal between the first rotor and the housing and/or the second rotor.

5. The apparatus according to claim 1, further comprising sealing means on the rotor element able to form a seal between the rotor element and the housing and/or the second rotor.

6. The apparatus according to claim 1, wherein a preceding face and/or a trailing face of the rotor element or the shoulder comprise a shape which reduces or mitigates drag in the fluid.

7. The apparatus according to claim 1, wherein the inlet and the outlet are located in a zone of the chamber through which the rotor element travels, and are located to avoid a zone through which the second rotor travels.

8. The apparatus according to claim 1, wherein the inlet and outlet are located on a region of a chamber wall substantially perpendicular to the first axis of the first rotor.

9. The apparatus according to claim 1, wherein the apparatus is adapted to introduce a pressurized fluid through the inlet to impart energy onto the rotor element.

10. The apparatus according to claim 9, wherein the fluid enters the inlet at an angle offset from the axis of rotation of the first rotor, so as to provide more direct pressure on the rotor element.

11. The apparatus according to claim 9, further comprising sealing means between the second rotor and the housing.

12. The apparatus according to claim 9, further comprising a second shoulder projecting from the first rotor on the other side of the rotor element to the shoulder.

13. The apparatus according to claim 9, comprising two rotor elements and two recesses in the second rotor able to receive the rotor elements; or wherein the second rotor has twice the diameter of the first rotor, and the second rotor comprises two recesses able to receive the rotor element.

14. The apparatus according to claim 1, wherein the apparatus is adapted to impart rotational energy to the first rotor or the second rotor, to draw the fluid through the inlet and push the fluid out through the outlet.

15. The apparatus according to claim 14, wherein the shoulder follows the rotor element, and occludes the outlet during part of a cycle of the first rotor.

16. The use of an apparatus according to claim 14 as a pump.

17. The use of an apparatus according to claim 16, wherein the fluid is air or an air/oxygen mixture, and the pump is a respirator pump.

18. The use of an apparatus according to claim 1 as a turbine.

19. A rotary drive apparatus comprising:
a housing, within which is located
a first rotor and
second rotor,
the first rotor being rotatable about a first axis, having a rotor element projecting radially therefrom and
the second rotor being rotatable about a second axis parallel to the first axis and in a direction opposite to the first rotor,
the second rotor comprising a recess able to receive the rotor element,
wherein the first rotor and the second rotor and housing define a chamber around the first rotor through which the rotor element passes, the chamber having an inlet and an outlet through which a fluid can enter and exit the chamber, wherein when the rotor element is engaged in the recess, the rotor element substantially occludes both the inlet and the outlet at the same time.

20. The apparatus according to claim 19, wherein the apparatus further comprises an extension to the inlet and/or the outlet further creating a venting region.

21. The apparatus according to claim 19, wherein the rotor element occupies a sector of between about 60° and about 120°, with respect to the axis of the first rotor.

22. The apparatus according to claim 21, wherein the rotor element occupies a sector of about 80° with respect to the axis of the first rotor.

23. The apparatus according to claim 19, wherein the apparatus further comprises ignition means and is adapted to introduce a combustible fluid or mixture of fluids through the inlet for combustion to impart energy onto the rotor element.

24. The use of an apparatus according to claim 23 as a combustion engine.

25. A rotary drive apparatus comprising a housing within which is located
a first rotor and
second rotor,
the first rotor being rotatable about a first axis, having a rotor element projecting radially therefrom and
the second rotor being rotatable about a second axis parallel to the first axis and in a direction opposite to the first rotor,
the second rotor comprising a recess able to receive the rotor element,
wherein the first rotor and the second rotor and housing define a chamber around the first rotor through which the rotor element passes, the chamber having an inlet and an outlet through which a fluid can enter and exit the chamber,
wherein when the rotor element is engaged in the recess, the rotor element substantially occludes both the inlet and the outlet at the same time and wherein the rotor element is defined by:
a leading face which during rotation of the first rotor precedes the other parts of the rotor element, a trailing face opposed to the leading face, and an outer face which during the rotation of the first rotor, contacts or nearly contacts a wall of the chamber;
an outer leading junction between the leading face and the outer face of the rotor element;
an outer trailing junction between the trailing face and the outer face of the rotor element;
an inner leading junction between an outer wall of the first rotor and the leading face of the rotor element;

an outer trailing junction between the outer wall of the first rotor and the trailing face of the rotor element;

and wherein the recess is defined by:

walls spaced apart to accommodate the leading face and the trailing face of the rotor element, and a floor which contacts or nearly contacts the outer face of the rotor element when the rotor element is received in the recess;

an inner leading junction between the floor and the leading wall of the recess;

an inner trailing junction between the floor and the trailing wall of the recess;

an outer leading junction between the leading wall of the recess, and an outer wall of the second rotor; and an outer trailing junction between the trailing wall of the recess, and the outer wall of the second rotor wherein, at an engaged position where the outer junctions of the rotor element are equidistant from a line X connecting the axes of the rotors, (a) the inner junctions of the rotor element are located by lines extending from the axis of the first rotor and making angles of about +37°, −37° with said line X;

the outer junctions of the rotor element are located by a line extending from the axis of the first rotor and making angles of about +30°, −30° with said line X;

the inner junctions of the recess are located by a line extending from the axis of the second rotor and making angles of about +38°, −38° with said line X; and the inlet and outlet are located in a zone through which the rotor element travels, but they avoid a zone through which the second rotor travels;

(b) the inner and outer junctions of the rotor element are located by lines extending from the axis of the first rotor and making angles of about +40°, −40° with said line X;

the inner junctions of the recess are located by a line extending from the axis of the second rotor and making angles of about +43°, −43° with said line X;

the outer junctions of the recess are located by a line extending from the axis of the second rotor and making angles of about +46°, −46° with said line X;

and the inlet and outlet are located in the zone through which the rotor element travels, but they avoid the zone through which the second rotor travels;

(c) the inner and outer junctions of the rotor element are located by lines extending from the axis of the first rotor and making angles of about +40°, −40° with said line X;

the inlet is located in the zone through which the rotor element travels and within a line extending from the axis of the first rotor and making an angle of about +38° with said line X, and avoids the zone through which the second rotor travels, the outlet is located in the zone through which the rotor element travels and within a line extending from the axis of the first rotor and making an angle of about −39° with said line X, and avoids the zone through which the second rotor travels, the inner junctions of the recess are located by a line extending from the axis of the second rotor and making angles of about +45°, −45° with said line X;

the outer junctions of the recess are located by a line extending from the axis of the second rotor and making angles of about +53°, −53° with said line X; or (d) the inner and outer junctions of the rotor element are located by lines extending from the axis of the first rotor and making angles of about +40°, −40° with said line X;

the inlet is located in the zone through which the rotor element travels and within a line extending from the axis of the first rotor and making an angle of about +38° with said line X, and avoids the zone through which the second rotor travels, the outlet is located in the zone through which the rotor element travels and within a line extending from the axis of the first rotor and making an angle of about −39° with said line X, and avoids the zone through which the second rotor travels, the inner junctions of the recess are located by a line extending from the axis of the second rotor and making angles of about +46°, −46° with said line X; and the outer junctions of the recess are located by a line extending from the axis of the second rotor and making angles of about +53°, −53° with said line X.

26. The apparatus according to claim 25, wherein the inner and outer junctions of the rotor element are located by lines extending from the axis of the first rotor and making angles of about +40°, −40° with said line X;

the inlet is located in the zone through which the rotor element travels and within a line extending from the axis of the first rotor and making an angle of about +38° with said line X, and avoids the zone through which the second rotor travels, the outlet is located in the zone through which the rotor element travels and within a line extending from the axis of the first rotor and making an angle of about −39° with said line X, and avoids the zone through which the second rotor travels, the inner junctions of the recess are located by a line extending from the axis of the second rotor and making angles of about +45°, −45° with said line X;

the outer junctions of the recess are located by a line extending from the axis of the second rotor and making angles of about +53°, −53° with said line X, wherein the space between the inlet and outlet is defined by lines extending from the axes of both rotors, and making angles of about +15°, −15° with said line X.

* * * * *

UNITED STATES PATENT AND TRADEMARK OFFICE
CERTIFICATE OF CORRECTION

PATENT NO. : 12,158,102 B2
APPLICATION NO. : 18/250058
DATED : December 3, 2024
INVENTOR(S) : David George Robson Page 1 of 1

It is certified that error appears in the above-identified patent and that said Letters Patent is hereby corrected as shown below:

In the Specification

Column 2, Line 29: Delete "of paragraph [00014]" and insert -- described above in lines 23-25 of this column. --

Column 2, Line 32: Delete "of paragraph [00014]" and insert -- described above in lines 23-25 of this column. --

Column 2, Line 35: Delete "of paragraph [00014]" and insert -- described above in lines 23-25 of this column. --

Column 2, Line 38: Delete "of paragraph [00014]" and insert -- described above in lines 23-25 of this column. --

Column 4, Line 35: Delete "of paragraph [00035]" and insert -- described above in lines 31-34 of this column. --

Column 4, Line 38: Delete "of paragraph [00035]" and insert -- described above in lines 31-34 of this column. --

Column 4, Line 42: Delete "of paragraph [00035]" and insert -- described above in lines 31-34 of this column. --

Signed and Sealed this
Eleventh Day of February, 2025

Coke Morgan Stewart
*Acting Director of the United States Patent and Trademark Office*